United States Patent
Cheng et al.

(10) Patent No.: US 12,141,175 B2
(45) Date of Patent: Nov. 12, 2024

(54) SYSTEM AND METHOD FOR DOSSIER CREATION WITH FREE-FORM LAYOUT

(71) Applicant: MicroStrategy Incorporated, Tysons Corner, VA (US)

(72) Inventors: Zhili Cheng, Dunn Loring, VA (US); Keng-Fu Chu, Fairfax, VA (US); Alejandro Olvera Velasco, Falls Church, VA (US); Jeffrey Courcelle, Herndon, VA (US)

(73) Assignee: MICROSTRATEGY INCORPORATED, Tysons Corner, VA (US)

( * ) Notice: Subject to any disclaimer, the term of this patent is extended or adjusted under 35 U.S.C. 154(b) by 2 days.

(21) Appl. No.: 16/730,147

(22) Filed: Dec. 30, 2019

(65) Prior Publication Data

US 2021/0200790 A1    Jul. 1, 2021

(51) Int. Cl.
*G06F 16/28* (2019.01)
*G06F 16/242* (2019.01)
*G06F 16/248* (2019.01)
*G06F 16/26* (2019.01)

(52) U.S. Cl.
CPC ........ *G06F 16/287* (2019.01); *G06F 16/2428* (2019.01); *G06F 16/248* (2019.01); *G06F 16/26* (2019.01)

(58) Field of Classification Search
CPC .... G06F 16/287; G06F 16/2428; G06F 16/26; G06F 16/248
See application file for complete search history.

(56) References Cited

U.S. PATENT DOCUMENTS

| | | | | |
|---|---|---|---|---|
| 7,661,061 B2* | 2/2010 | Joshi | | G06F 8/20 715/205 |
| 7,818,372 B1* | 10/2010 | Cutrell | | G06Q 10/00 715/236 |
| 9,330,079 B1* | 5/2016 | Marcks | | G06Q 30/0277 |
| 2005/0065913 A1* | 3/2005 | Lillie | | G06F 16/954 |
| 2006/0026557 A1* | 2/2006 | Petri | | G06F 16/958 717/106 |
| 2006/0031849 A1* | 2/2006 | Barta | | G06F 9/4843 719/320 |
| 2006/0075357 A1* | 4/2006 | Guido | | G06F 3/04855 715/787 |
| 2006/0080612 A1* | 4/2006 | Hayes, Jr. | | G06F 16/9577 715/255 |
| 2006/0122895 A1* | 6/2006 | Abraham | | G06Q 30/02 705/26.8 |
| 2007/0006083 A1* | 1/2007 | Daniels | | G06F 16/9577 715/742 |

(Continued)

*Primary Examiner* — Thu V Huynh
(74) *Attorney, Agent, or Firm* — MUNCY, GEISSLER, OLDS & LOWE, P.C.

(57) ABSTRACT

A method (and system) includes retrieving a dataset from a database creating a report including a graphical representation of the dataset, the graphical representation of the dataset including a freely positionable and scalable data container and displaying the report on a graphical user interface. The report has a free-form layout in which each container is freely positionable and is freely scalable such that a change in size and/or location of one container does not affect a size and/or location of any other container in the report.

14 Claims, 23 Drawing Sheets

(56) References Cited

U.S. PATENT DOCUMENTS

| | | | |
|---|---|---|---|
| 2007/0256054 A1* | 11/2007 | Byrne | G06F 8/73 717/113 |
| 2007/0282673 A1* | 12/2007 | Nagpal | G06Q 10/06 705/7.29 |
| 2007/0283020 A1* | 12/2007 | Chowdary | G06F 16/958 709/227 |
| 2007/0283281 A1* | 12/2007 | Ainsworth | G06F 16/958 707/E17.116 |
| 2008/0201645 A1* | 8/2008 | Francis | G06F 3/0482 715/764 |
| 2009/0064004 A1* | 3/2009 | Chakra | G06F 16/958 715/764 |
| 2009/0100358 A1* | 4/2009 | Lauridsen | H04L 67/025 715/762 |
| 2009/0222720 A1* | 9/2009 | Drieschner | G06F 16/9566 715/234 |
| 2010/0318899 A1* | 12/2010 | Kitada | H04N 1/3872 715/243 |
| 2011/0210986 A1* | 9/2011 | Goutsev | G06F 8/38 345/672 |
| 2012/0005618 A1* | 1/2012 | Tofinetti | G06F 3/0483 715/777 |
| 2012/0174027 A1* | 7/2012 | Meier | G06F 3/04847 715/786 |
| 2013/0162390 A1* | 6/2013 | Ersavas | A01G 25/16 340/3.1 |
| 2013/0332869 A1* | 12/2013 | Ferry | G06F 3/04847 715/765 |
| 2014/0033119 A1* | 1/2014 | Kim | G06F 3/0486 715/800 |
| 2014/0096042 A1* | 4/2014 | Travis | G06F 3/0483 715/760 |
| 2014/0146650 A1* | 5/2014 | Alber | G11B 27/34 369/53.41 |
| 2018/0374225 A1* | 12/2018 | Edge | G06F 40/106 |
| 2019/0108265 A1* | 4/2019 | Barmentloo | G06F 16/287 |
| 2020/0327711 A1* | 10/2020 | Walker | G06K 9/6221 |

* cited by examiner

Figure 9A                                    Figure 9B

SYSTEM AND METHOD FOR DOSSIER CREATION WITH FREE-FORM LAYOUT

BACKGROUND OF THE INVENTION

Field of the Invention

The present invention generally relates to a method and system for displaying data, and more particularly to a method and system for creating a business analytic report having a free-form layout to visualize data.

Description of the Related Art

Large databases are common in business today. Indeed, the amount of data available to business organizations today is rapidly increasing. Thus, a challenge for many organizations is to find a way to timely sort and present all relevant information while filtering unnecessary information.

In reporting systems, such as decision support systems, business intelligence systems and on-line analytical processing (OLAP) systems, data sorting and extraction are used to retrieve and present data in an efficient manner. Additionally, the reporting systems provide a means for a user to clearly and creatively present an interactive visualization of the relevant data.

Specifically, dossier building systems and programs or report system services documents (RSD) exists in which users can create a dashboard or canvas having one more datasets displayed in different containers. The data sets in each container display an interactive visualization of user selected data (e.g., a table, graph, pie chart, etc.). Particularly, a RSD contains datasets from one or more reports. The data is positioned and formed into a single visual representation of the data that can be presented to a user. The datasets can be displayed in a document or a RSD dashboard. When a user creates a document, report, dossier, visualization, or dashboard, the user specifies the data that appears. Furthermore, the user can control the layout, formatting and grouping of the data.

In current report or dashboard building systems, the dossiers or dashboards can be difficult to build and require precise positioning of the elements of the dashboard/canvas (i.e., the containers). That is, in current report or dashboard building systems the containers are all connected such that a change to one container will initiate a change in the other containers on the dashboard. For example, if a user changes a size or location of one of the containers, the size or location of the other containers will also change. Thus, current report or dashboard building systems lack sufficient flexibility in report creation.

Furthermore, in current report or dashboard building systems, when a user creates a report or dashboard on one platform or device, the report or dashboard is not easily formatted to other platforms or devices. For example, if a user creates a report or dashboard on a laptop computer and formats the report or dashboard to the dimensions of the display of the laptop computer, the report or dashboard will not be properly displayable on another device with different dimensions (e.g., a mobile telephone, tablet, etc.).

SUMMARY OF THE INVENTION

In view of the foregoing and other exemplary problems, drawbacks, and disadvantages of the conventional methods and structures, an exemplary feature of the present invention is to provide a method and system for generating reports, which maintains the responsiveness of the canvass layout while increasing the flexibility of design of the layout.

In a first, exemplary, non-limiting aspect of the present invention, a method includes retrieving a dataset from a database, creating a report including a graphical representation of the dataset, the graphical representation of the dataset including a freely positionable and scalable data container, and displaying the report on a graphical user interface.

In a second, exemplary, non-limiting aspect of the present invention, a non-transitory computer processor-readable storage medium storing instructions is configured for execution by a computer for retrieving a dataset from a database, creating a report including a graphical representation of the dataset, the graphical representation of the dataset including a freely positionable and scalable data container or frame, and displaying the report on a graphical user interface.

In a third, exemplary, non-limiting aspect of the present invention, a system includes a database storing a dataset, a processor configured to create a report including a graphical representation of the dataset, the graphical representation of the dataset including a freely positionable and scalable data container, and a graphical user interface configured to display the report.

In accordance with the above, exemplary aspects of the present invention, a method and system are provided in which the gap between dossier authoring and RSD is bridged by providing increased flexibility in report generation. That is, in the present invention, the data containers or frames are freely scalable and positionable such that a user can individually change the size and position of a container without affecting the size and position of other data containers. Furthermore, a user can overlap the containers to create multiple layers in a report or dashboard. That is, all objects on the report or dashboard can be independently positioned, sized and layered to provide a canvas having a completely free-form layout.

Moreover, not only is it possible to overlap containers, but it is also possible to group the containers together in order to achieve more complex methods of presenting the data (e.g., by overlapping a ring chart with a KPI (key performance indicator)) in the middle, or overlapping line charts and grids, then grouping them), in order to visualize different lenses of the data through "compound" visualizations that maintain their relative position and size when the dossier goes responsive. This automatic responsiveness and the ability to group containers that are overlapped, or positioned next to each other, allows authors to build content once and be able to deploy it in different form-factors, particularly in hand-held devices. That is, when the dossier goes responsive, containers auto-arrange in a vertical, scrollable stack, but grouped containers preserve their relative position, size and remain overlapped, so that compound visualizations created by the author are still consumable in screens with a reduced width (i.e. less than 768 (virtual) pixels, which is typical of hand-held devices).

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figure 1:
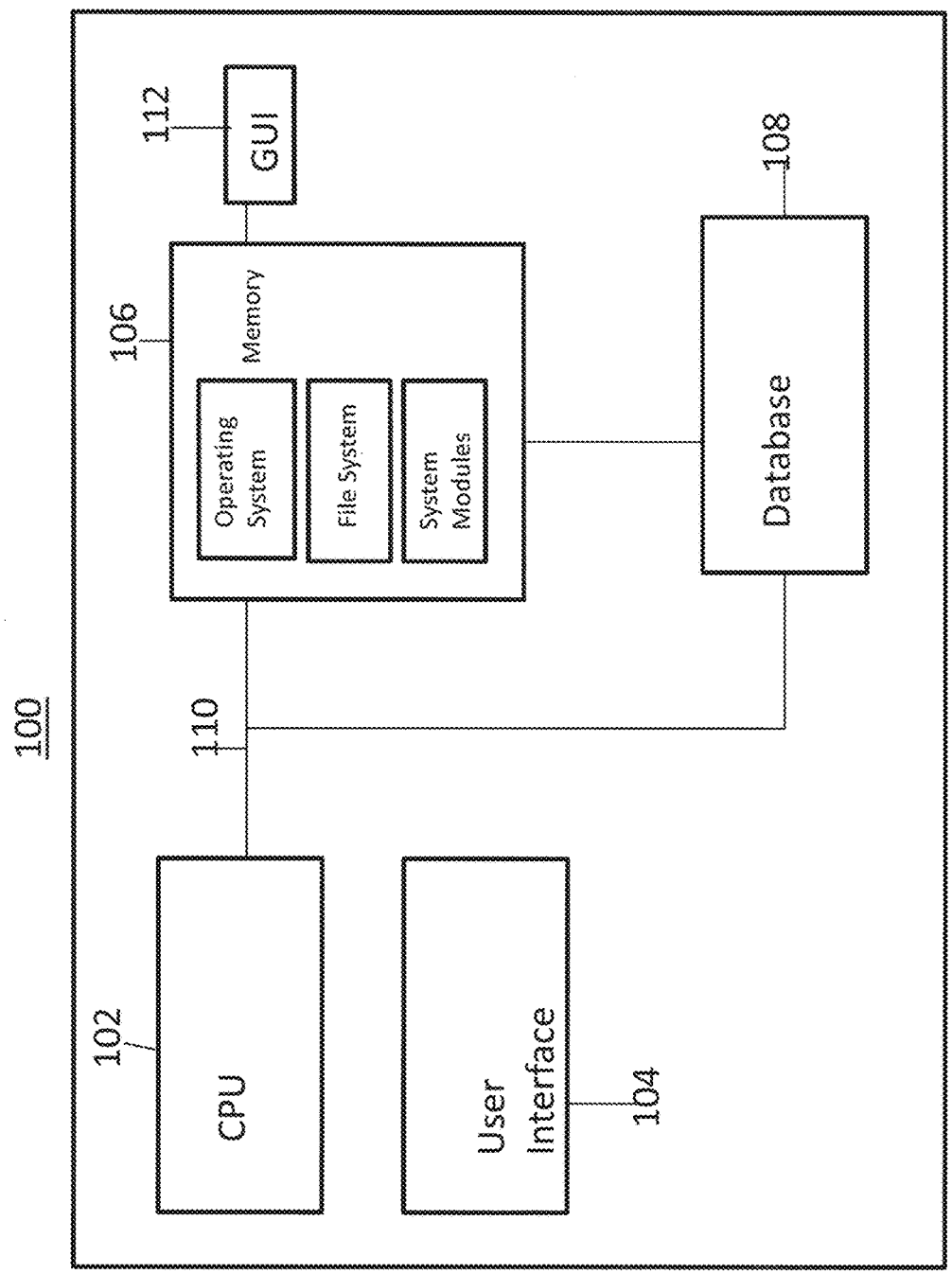
FIG. 1 illustrates a system 100 according to certain exemplary embodiments of the present invention.

Referring now to the drawings, and more particularly to FIGS. 1-14F, there are shown exemplary embodiments of the method and structures according to the present invention.

FIG. 1 is a block diagram illustrating a system 100 according certain exemplary aspects of the invention. Specifically, the system 100 is configured to create reports/documents/dossiers including a visualization of one or more datasets. As is illustrated in FIG. 1, the system 100 includes a CPU 102 having a user interface 104 (e.g., mouse, keyboard, touch screen, etc.). The CPU 102 is connected to a memory 106, storing an operating system, file system and computer system modules configured to perform the method of the present invention (e.g., process data and generate reports), and a database 108, storing one or more datasets, by a system bus 110. The system 100 includes a graphical user interface (GUI) 112 configured to receive and display a generated report.

Figure 2:
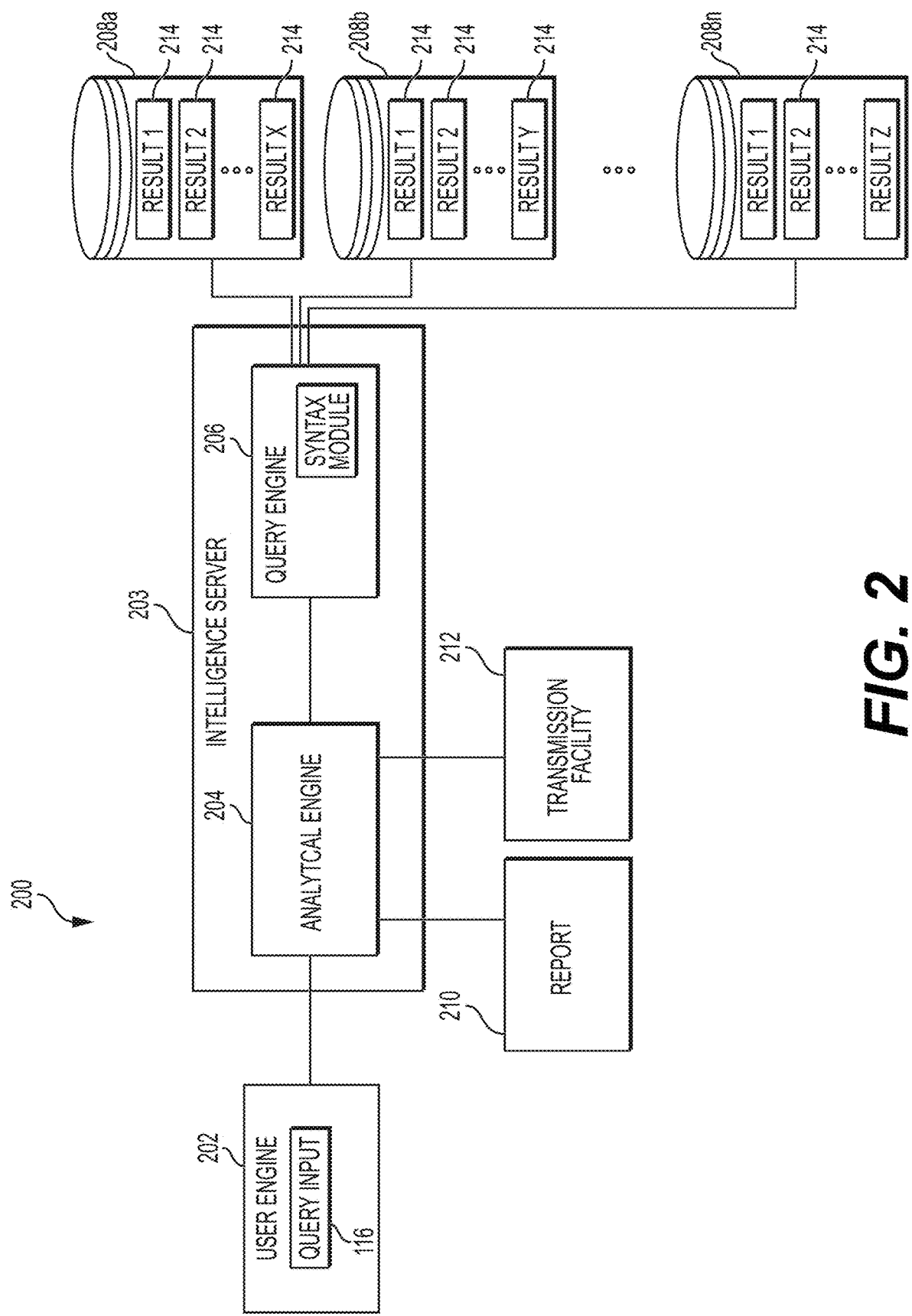
FIG. 2 illustrates a system 200 according to certain exemplary embodiments of the present invention.

FIG. 2 further defines elements of the system in accordance with certain exemplary embodiments of the present invention. Specifically, FIG. 2 is a block diagram illustrating a system 200 by which a variety of data resources may be accessed for business analytic, report generation and other intelligence purposes according to an embodiment of the invention. According to certain exemplary embodiments of the invention, the system 200 may comprise an online analytical processing (OLAP) decision support system (DSS). In particular, FIG. 2 may comprise a portion of the Microstrategy platform, which provides a preferred system in which the present invention may be implemented.

In general, through using the system 200 of the invention, analysts, managers and other users may query or interrogate a plurality of databases or database arrays to extra demographic, sales and/or financial data and information and other patterns from records stored in such databases or database arrays to identify strategic trends. The strategic trends may not be discernable without processing the queries and treating the results of the data extraction according to the techniques performed by the systems and methods of the invention. This is in part because the size and complexity of some data portfolios stored in such databases or database arrays may mask those trends.

In addition, the system 200 may enable the creation of reports or services that are processed according to a schedule. Users may then subscribe to the service, provide personalization criteria and have the information automatically delivered to the user.

As illustrated in FIG. 2, a business, government, user or other organization may access the resources of the system 200 using a user engine 202. The user engine 202 may include a query input module 216 to accept a plurality of searches, queries or other requests, via a query box or on a graphical user interface (GUI) or another similar interface. The user engine 202 may communicate with an analytical engine 204. The analytical engine 204 may include a set of extensible modules to run a plurality of statistical analyses, to apply filtering criteria, to perform a neural net technique or another technique to condition and treat data extracted from data resources hosted in the system 200, according to a query received from the user engine 202.

The analytical engine 204 may communicate with a query engine 206, which in turn interfaces to one or more data storage devices 208a, 208b . . . 208n (where n is an arbitrary number). The data storage devices 208a, 208b . . . 208n may include or interface to a relational database or another structured database stored on a hard disk, an optical disk, a solid state device or another similar storage media. When implemented as databases, the data storage devices 208a, 208b . . . 208n may include or interface to, for example, an Oracle™ relational database such as sold commercially by Oracle Corporation, an IBM Informix™ database, a Database 2 (DB2) database, a Teradata database, or another data storage device or query format, platform or resource such as an OLAP format, a Standard Query Language (SQL) format, a storage area network (SAN), or a Microsoft Access™ database. It should be understood that while data storage devices 208a, 208b . . . 208n are illustrated as a plurality of data storage devices, in some embodiments the data storage devices may be contained within a single database or another single resource.

Any of the user engine 102, the analytical engine 104 and the query engine 106 or other resources of the system 100 may include or interface to or be supported by computing resources, such as one or more associated servers. When a server is employed for support, the server may include, for instance, a workstation running a macOS operating system, a Windows™ 10 operating system, a Unix operating system, or a a Linux operating system, or a server running an Oracle Solaris™ operating system, a macOS, Red Hat, Ubuntu or other Linux-based server operating systems. According to one embodiment of the present invention, the analytical engine 304 and the query engine 306 may comprise elements of an intelligence server 303.

The data storage devices 208a, 208b . . . 208n may be supported by a server or another resource and may, in some embodiments, include redundancy, such as a redundant array of independent disks (RAID), for data protection. The storage capacity of any one or more of the data storage devices 208a, 208b . . . 208n may be of various sizes, from relatively small datasets to very large database (VLDB)-scale datasets, such as warehouses holding terabytes of data or more. The fields and types of data stored within the data storage devices 208a, 208b ... 208n may also be diverse, and may include, for instance, financial, personal, news, marketing, technical, addressing, governmental, military, medical or other categories of data or information.

The query engine 206 may mediate one or more queries or information requests from those received from the user at the user engine 202 to parse, filter, format and otherwise process such queries to be submitted against the data contained in the data storage devices 208a, 208b ... 208n. Thus, a user at the user engine 202 may submit a query requesting information in SQL format, or have the query translated to SQL format. The submitted query is then transmitted via the analytical engine 204 to the query engine 206. The query engine 206 may determine, for instance, whether the transmitted query may be processed by one or more resources of the data storage devices 208a, 208b ... 208n in its original format. If so, the query engine 206 may directly transmit the query to one or more of the resources of the data storage devices 208a, 208b ... 208n for processing.

If the transmitted query cannot be processed in its original format, the query engine 206 may perform a translation of the query from an original syntax to a syntax compatible with one or more of the data storage devices 208a, 208b ... 208n by invoking a syntax module 218 to conform the syntax of the query to standard SQL, DB2, IBM Informix™, Teradata formats or to other data structures, syntax or logic.

The query engine 206 may likewise parse the transmitted query to determine whether it includes any invalid formatting or to trap other errors included in the transmitted query, such as a request for sales data for a future year or other similar types of errors. Upon detecting an invalid or an unsupported query, the query engine 206 may pass an error message back to the user engine 202 to await further user input.

When a valid query such as a search request is received and conformed to a proper format, the query engine 206 may pass the query to one or more of the data storage devices 208a, 208n ... 208n for processing. In some embodiments, the query may be processed for one or more hits against one or more databases in the data storage devices 208a, 208b ... 208n. For example, a manager of a restaurant chain, a retail vendor or another similar user may submit a query to view gross sales made by the restaurant chain or retail vendor in the State of New York for the year 1999. The data storage devices 208a, 208b ... 208n may be searched for one or more fields corresponding to the query to generate a set of results 214.

Although illustrated in connection with each data storage device 208 in FIG. 1, the results 214 may be generated from querying any one or more of the databases of the data storage devices 208a, 208b ... 208n, depending on which of the data resources produce hits from processing the search query. In some embodiments of the system 200 of the invention, the results 214 may be maintained on one or more of the data storage devices 208a, 208b ... 208n to permit one or more refinements, iterated queries, joinders or other operations to be performed on the data included in the results 214 before passing the information included in the results 214 back to the analytical engine 204 and other elements of the system 200.

When any such refinements or other operations are concluded, the results 214 may be transmitted to the analytical engine 204 via the query engine 206. The analytical engine 204 may then perform statistical, logical or other operations on the results 214 for presentation to the user. For instance, in the State of New York reached $1 M in sales at the earliest time in the year 2019. Or, the user may submit a query asking for an average, a mean and a standard deviation of an account balance on a portfolio of credit or other accounts.

The analytical engine 204 may process such queries to generate a quantitative report 210, which may include a table or other output indicating the results 214 extracted from the data storage devices 208a, 208b ... 208n. The report 210 may be presented to the user via the user engine 202, and, in some embodiments, may be temporarily or permanently stored on the user engine 202, a client machine or elsewhere, or printed or otherwise output. In some embodiments of the system 200 of the invention, the report 210 or other output may be transmitted to a transmission facility 212, for transmission to a set of personnel via an email, an instant message, a text-to-voice message, a video or via another channel or medium. The transmission facility 212 may include or interface to, for example, a personalized broadcast platform or service. Similarly, in some embodiments of the invention, more than one user engine 202 or other client resource may permit multiple users to view the report 210, such as, for instance, via a corporate intranet or over the Internet using a Web browser. Various authorization and access protocols may be employed for security purposes to vary the access permitted users to such report 210 in such embodiments.

Additionally, an administrative level user may create a report as part of a service. Subscribers/users may then receive access to reports through various types of data delivery devices including telephones, email, wireless communication devices, mobile phones, tablets, and many others. In addition, subscribers may specify trigger conditions so that the subscriber receives a report only when that condition has been satisfied. The platform of FIG. 2 may have many other uses, as described in detail with respect to the MicroStrategy platform, the details of which will be appreciated by one of ordinary skill in the reporting and decision support system art.

Figure 3:
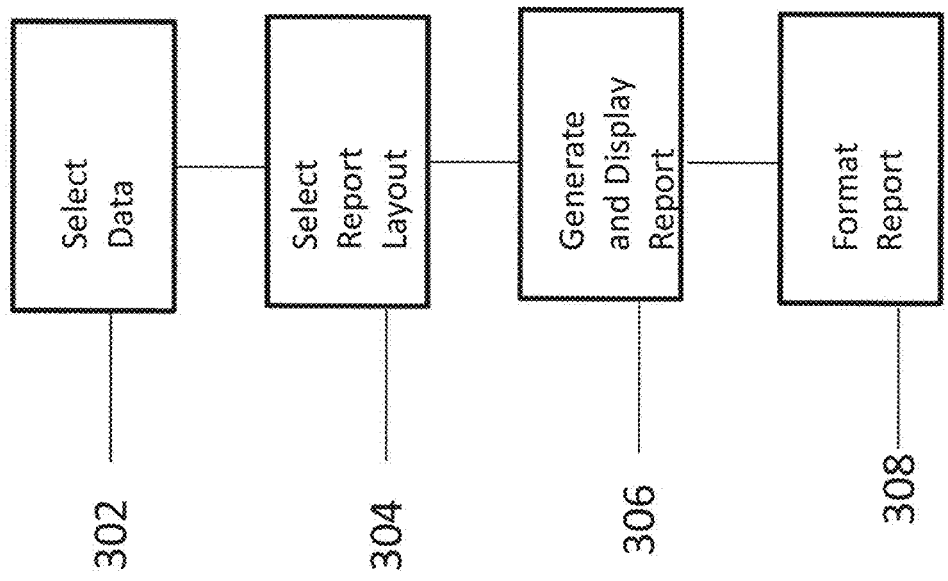
FIG. 3 illustrates a method 300 according to certain exemplary embodiments of the present invention.

FIG. 3 illustrates a basic flow chart of a method 300 for generating a report according to certain exemplary embodiments of the invention. At step 302, the system receives a request from a user for selecting one or more specific datasets from the database/data storage devices. At step 304, the user selects a report layout 304. At step 306, the system generates and displays the report based on the selected layout and selected dataset(s). At step 308, the user formats the layout and specific containers included in the layout.

Figure 4:
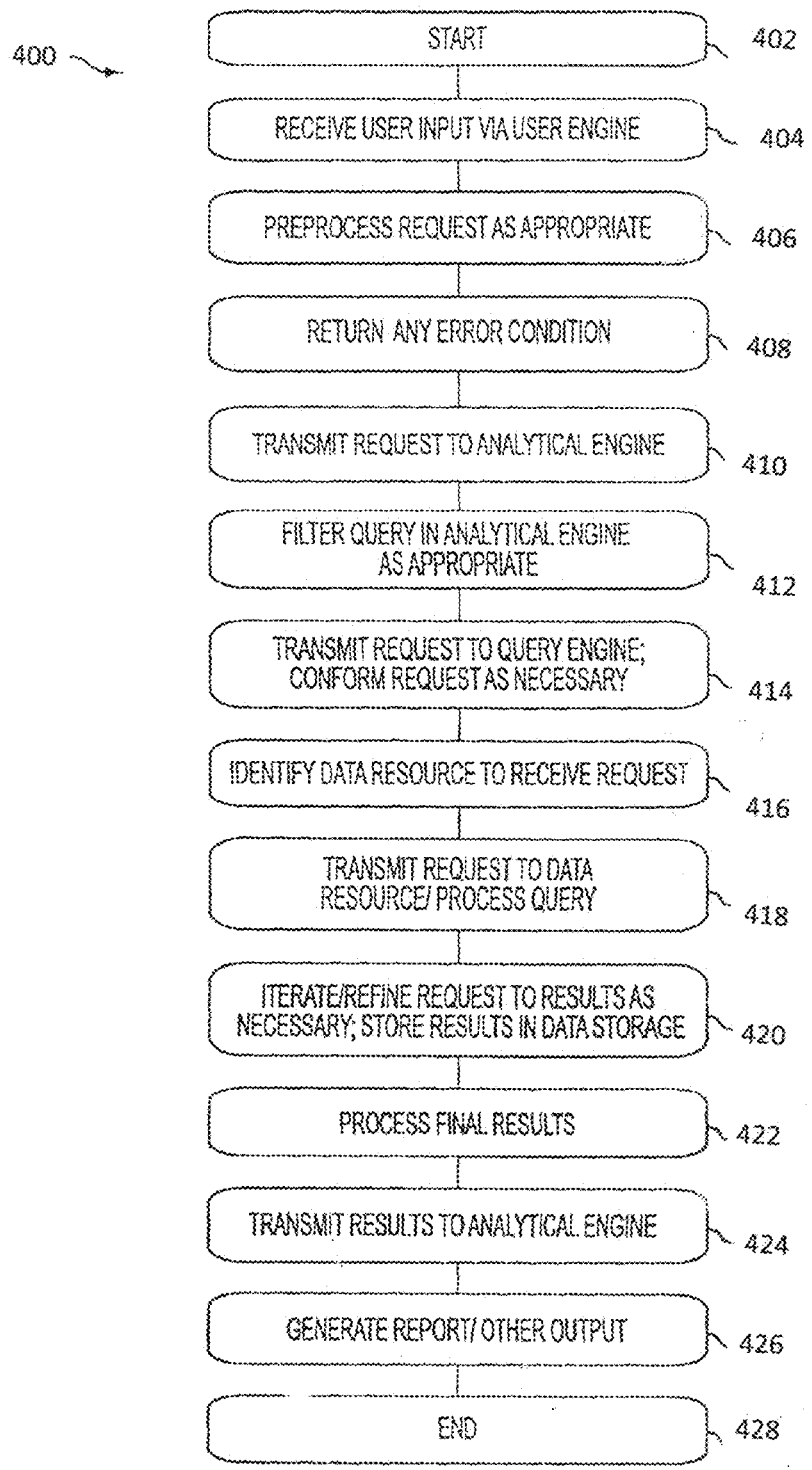
FIG. 4 illustrates a method 400 according to certain exemplary embodiments of the present invention.

The specific steps performed in a method 400 for generating a report according to certain exemplary embodiments of the present invention are illustrated in the flowchart of FIG. 4. In step 402, the method 400 begins. In step 404, the user may supply input, such as a query or a request for information, via the user engine 202. In step 406, the user input query may be preliminarily processed, for instance, to determine whether it includes valid fields and for other formatting and error-flagging issues. In step 408, any error conditions may be trapped and an error message presented to the user, for correction of the error conditions. In step 410, if a query is in a valid format, the query may then be transmitted to the analytical engine 204.

In step 412, the analytical engine 204 may further process the input query as appropriate to ensure the intended results 214 may be generated to apply the desired analytics. In step 414, the query engine 206 may further filter, format and otherwise process the input query to ensure that the query is in a syntax compatible with the syntax of the data storage devices 208a, 208b ... 208n. In step 416, one or more appropriate databases or other resources within the data storage devices 208a, 208b . . . 208n may be identified to be accessed for the given query.

In step 418, the query may be transmitted to the data storage devices 208a, 208b . . . 208n and the query may be processed for hits or other results 214 against the content of the data storage devices 208a, 208b . . . 208n. In step 420, the results 214 of the query may be refined, and intermediate or other corresponding results 214 may be stored in the data storage devices 208a, 208b . . . 208n. In step 422, the final results 214 of the processing of the query against the data storage devices 208a, 208b . . . 208n may be transmitted to the analytical engine 204 via the query engine 206. In step 424, a plurality of analytical measures, filters, thresholds, statistical or other treatments may be run on the results 214. In step 426, a report 210 may be generated. The report 210, or other output of the analytic or other processing steps, may be presented to the user via the user engine 202. In step 428, the method 400 ends.

Figure 5:
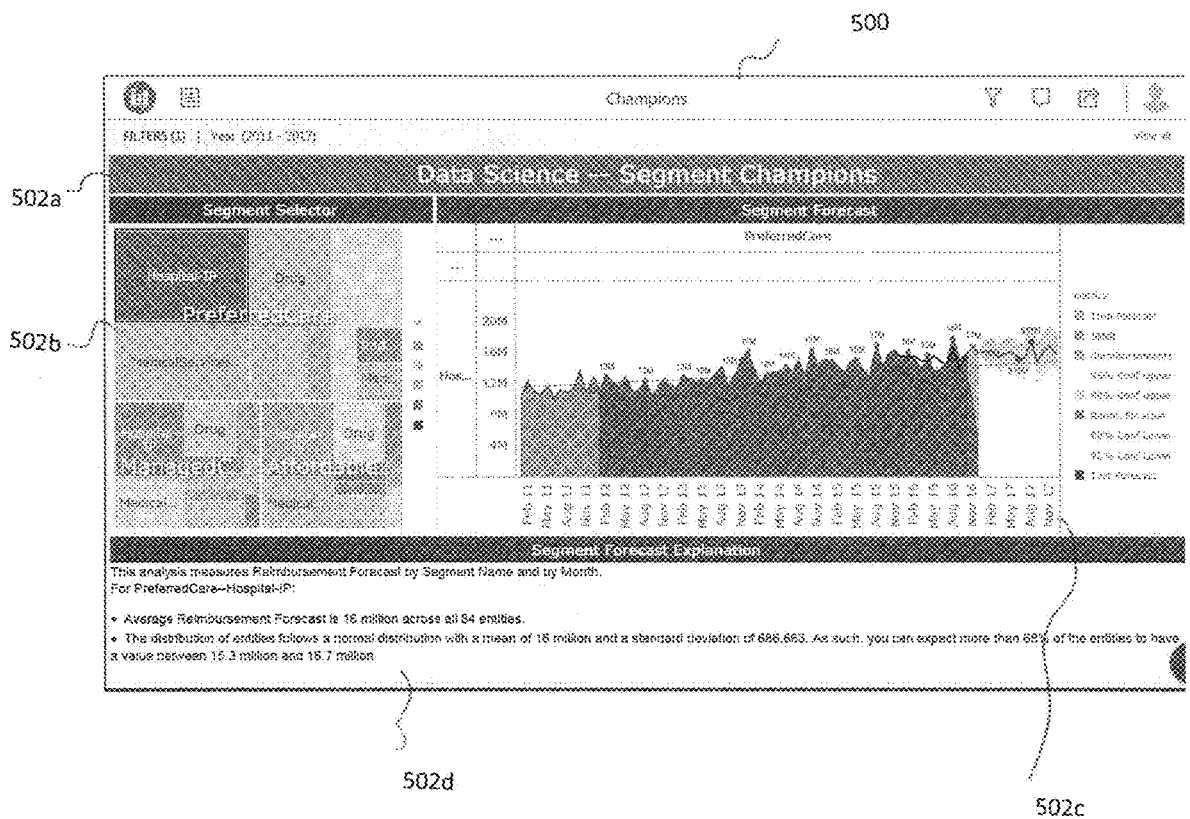
FIG. 5 illustrates an exemplary report generated by the system and method of the present invention.

FIG. 5 illustrates a report 500 generated by the system and method according to certain exemplary embodiments of the present invention. As illustrated in FIG. 5, the report 500 includes one or more containers 502a, 502b, 502c, 502d . . . 502n (where n is an integer greater than or equal to 1). The containers or frames include a visualization of one or more datasets selected by the user, as described above with respect to FIGS. 1-4. The data sets may be visualized as a chart, pie chart, graph, list, etc. For example, container 502c includes a graph visualizing user-selected data. Additionally, the containers may include a heading (e.g., 502a), information related to the data (e.g., 502d) or even images. The visualizations in the containers 502a, 502b, 502c, 502d . . . 502n can be static in which the user is merely presented with a visualization of a dataset. Alternatively, the containers may be interactive and responsive to user input gestures. For example, if a user selects an area of the container, the user may be able to scroll through information, zoom in or out, or be linked to another visualization of the dataset in the same or different report.

As noted above, in current report generating systems, the individual containers are linked. That is, in current report generating systems, when a change is made to one of the containers, the system automatically makes corresponding changes to the other containers. For example, a user selects a specific layout from a selection of possible layouts. Additionally, the user is limited by the layout such that if the user changes a size of one of the containers, the system automatically changes the size of the other containers in the layout.

Figure 6A:
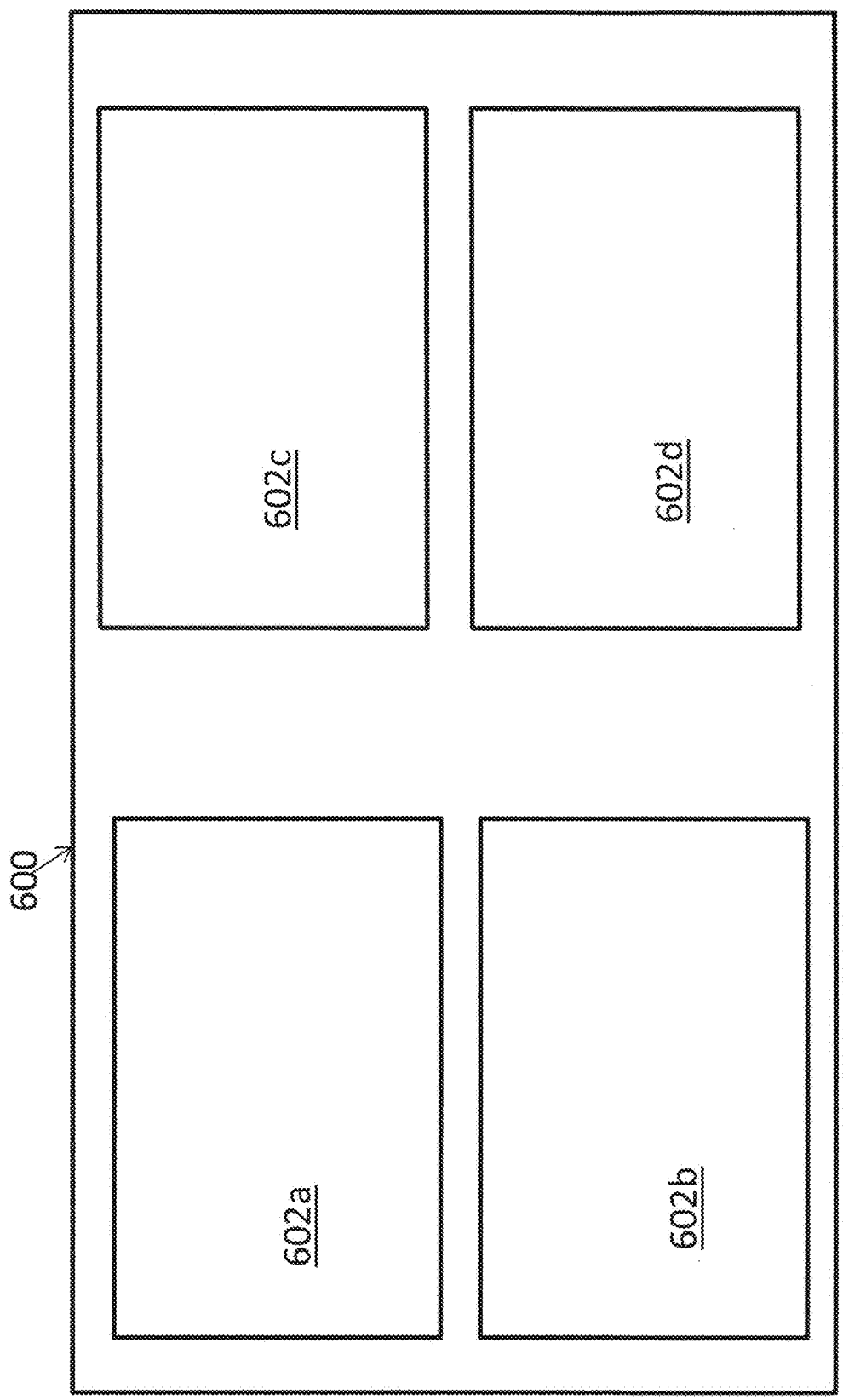
FIGS. 6A-6D illustrate another exemplary report generated by the system and method of the present invention.
Figure 6B:
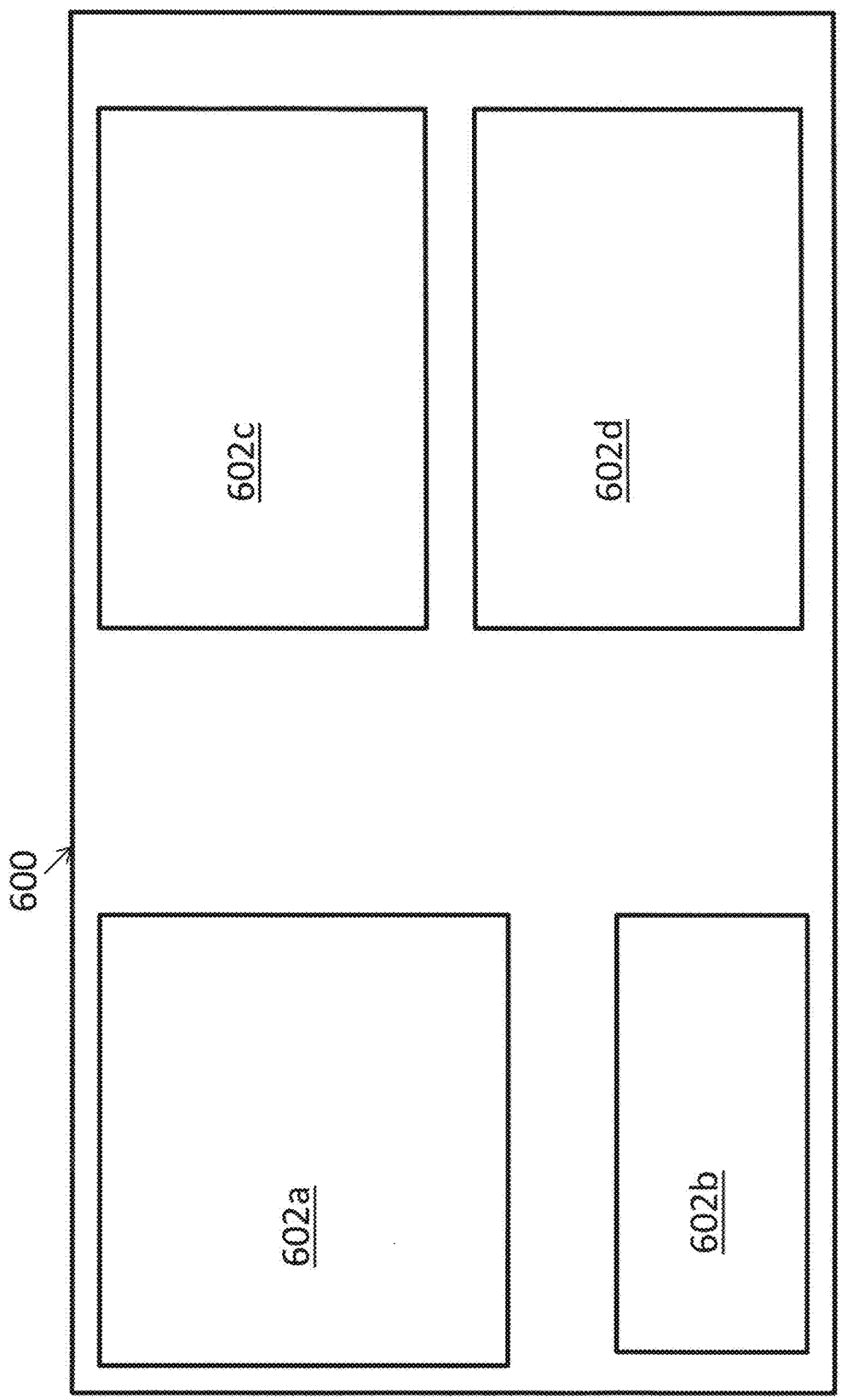
Figure 6C:
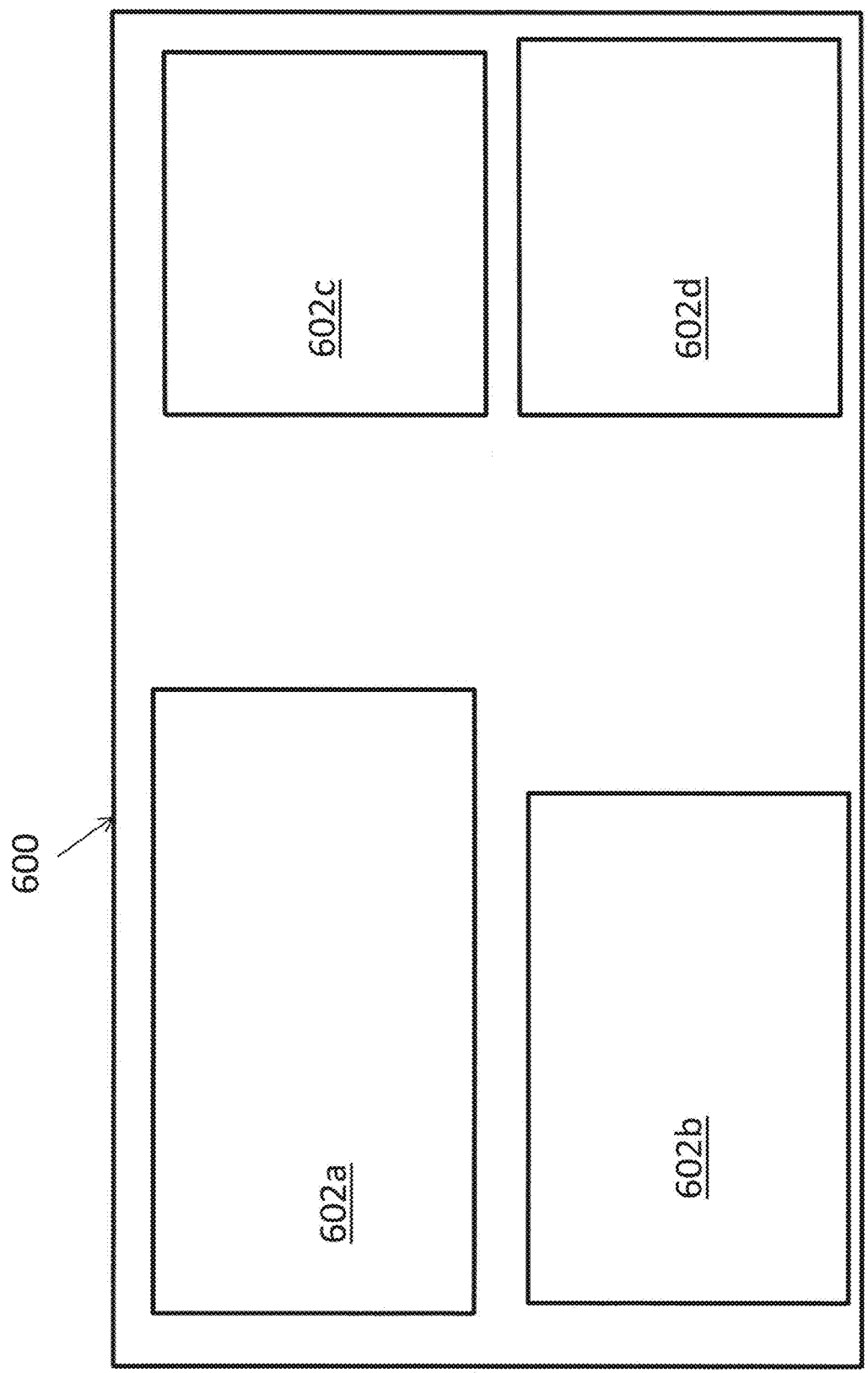

The above is further clarified with reference to FIGS. 6A-D. FIG. 6A illustrates a generic report 600 generated by a current report building system. The report 600 includes an arrangement of containers including, for example, four containers 602a-602d. In current report building systems and methods, the user, once having selected the canvas layout, cannot change the selected layout. That is, in the example illustrated in FIG. 6A, the user cannot remove one of the containers 602a-602d. The user is limited to the layout including four side-by-sided containers.

Furthermore, if any changes are made to one of the containers, then the other containers will be correspondingly changed by the system. For example, with reference to FIG. 6B, should the user increase the height of container 602a, then the height of container 602b will be automatically reduced by a corresponding amount. Similarly, with reference to FIG. 6C, should the user increase the width of container 602a, then the width of container 602c will be automatically reduced by a corresponding amount.

Figure 6D:
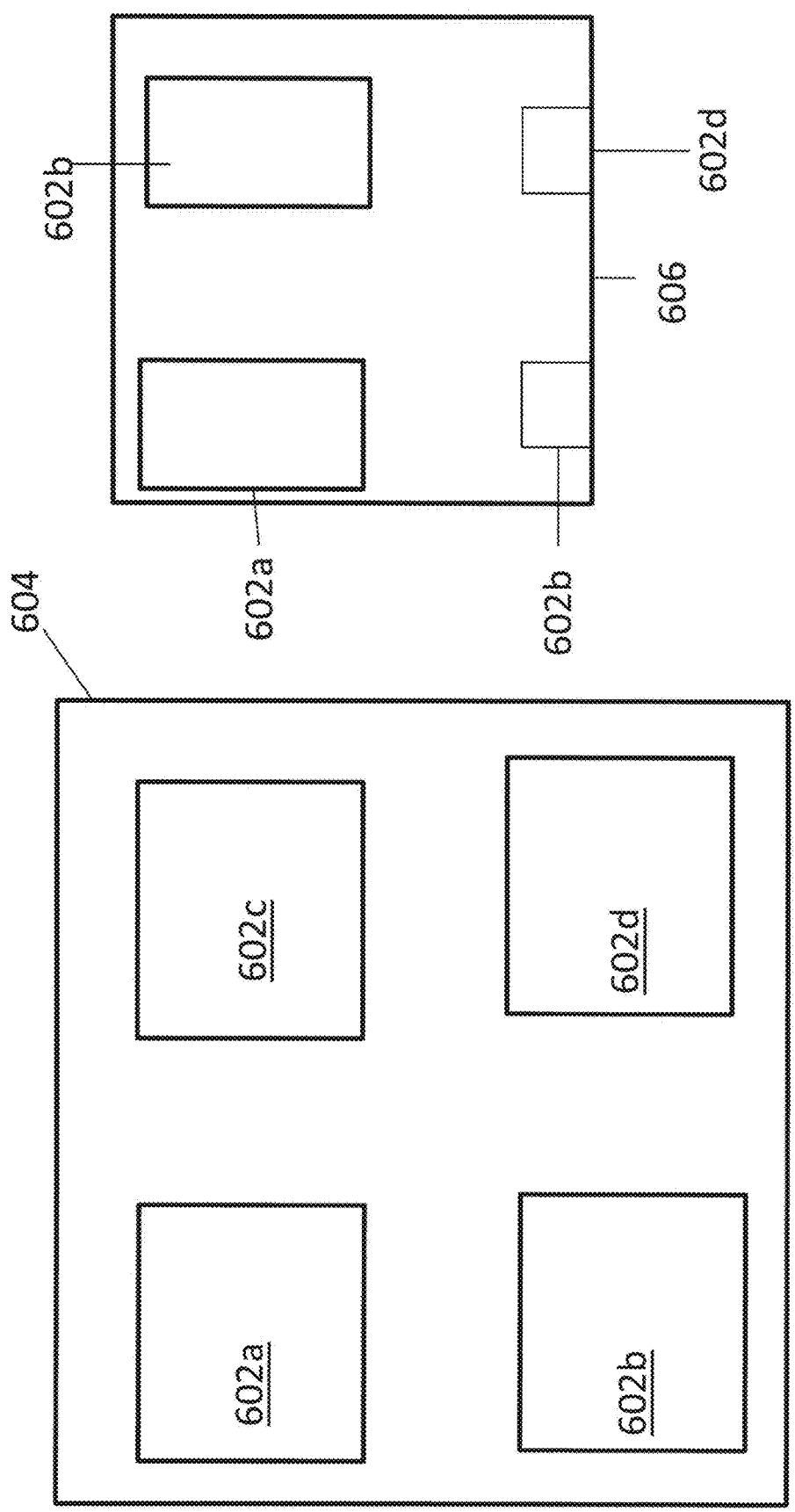

Furthermore, if the user creates a dossier on one platform, for example on a desk top computer, then the dossier canvas will be formatted to the dimensions of the desk top computer display. The dossier canvas will not necessarily be scalable to a display on another platform, for example a laptop computer display, a tablet display, or a mobile telephone display, etc. FIG. 6D illustrates a comparison of a dossier created and displayed on a first platform and formatted for a desk top computer display 604 and then displayed on a display of a mobile telephone 606. As is illustrated in FIG. 6D, the dossier, when displayed on the desk top computer display 606, is properly formatted and all containers are entirely visible. When displayed on the mobile telephone display, however, the canvas is not properly formatted and only a portion of the container layout is visible.

Each of the above problems and drawbacks in the current report building methods and systems is addressed by the inventive method and system of the present invention. That is, in accordance with certain exemplary embodiments of the present invention, a method and system is provided for generating a dossier canvas having a completely free-form layout in which the canvas is completely open and visualizations can be organized and overlapped in any way the user desires. That is, objects (e.g., data containers) can be independently positioned, sized and layered. The method and system in accordance with certain exemplary embodiments of the present invention are further illustrated with reference to FIGS. 7-12 as follows.

Figure 7:
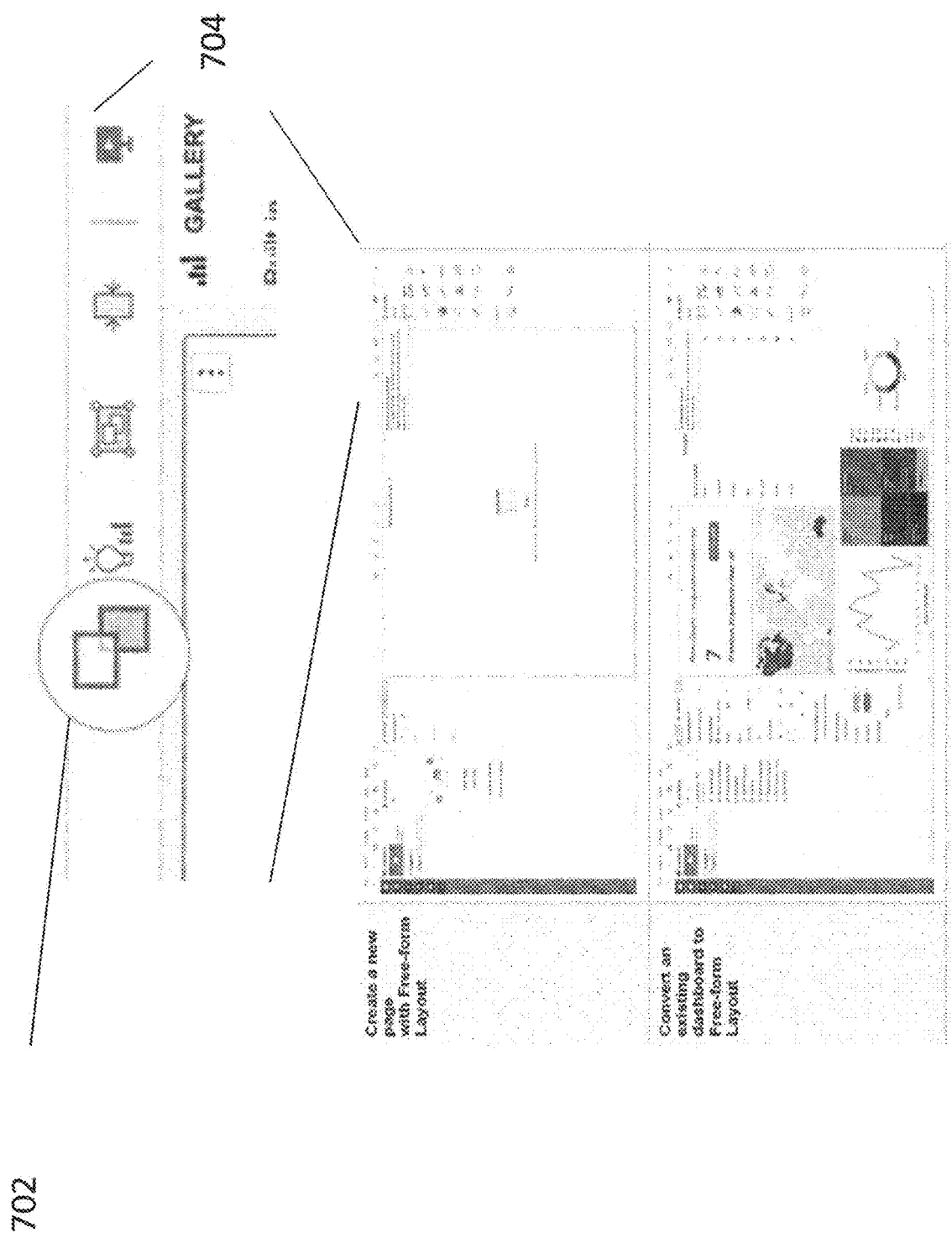
FIG. 7 illustrates a manner of creating a dossier page having a free-form layout according to certain exemplary embodiments of the present invention.
Figure 8:
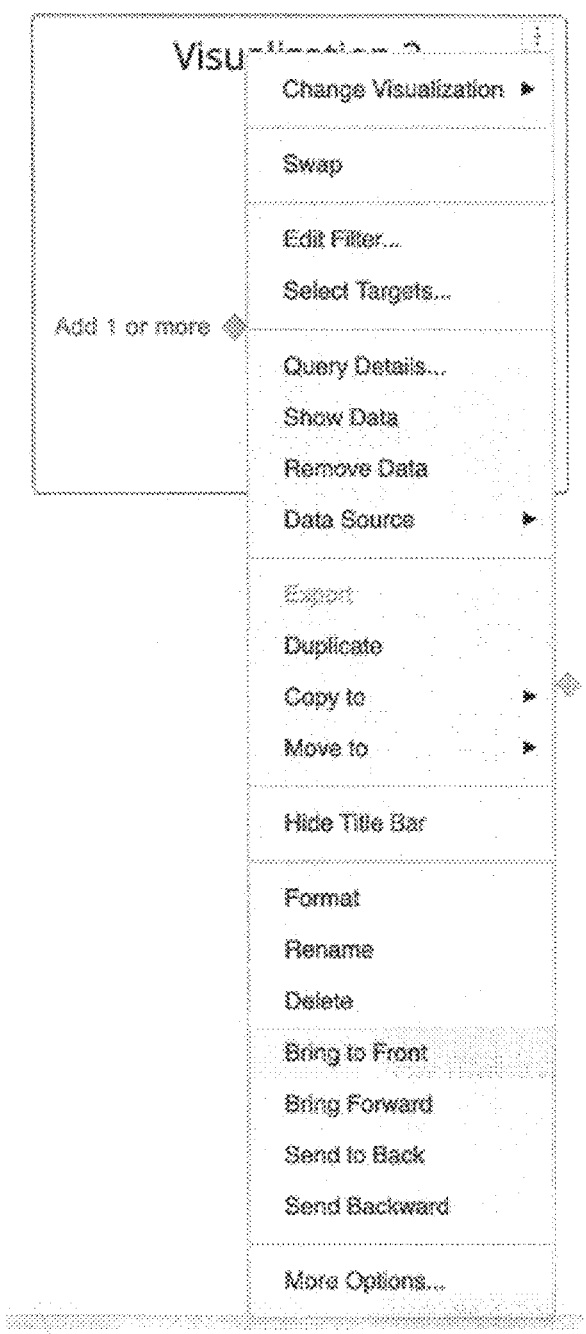
FIG. 8 illustrates a drop-down menu according to certain exemplary embodiments of the present invention.
Figure 9:
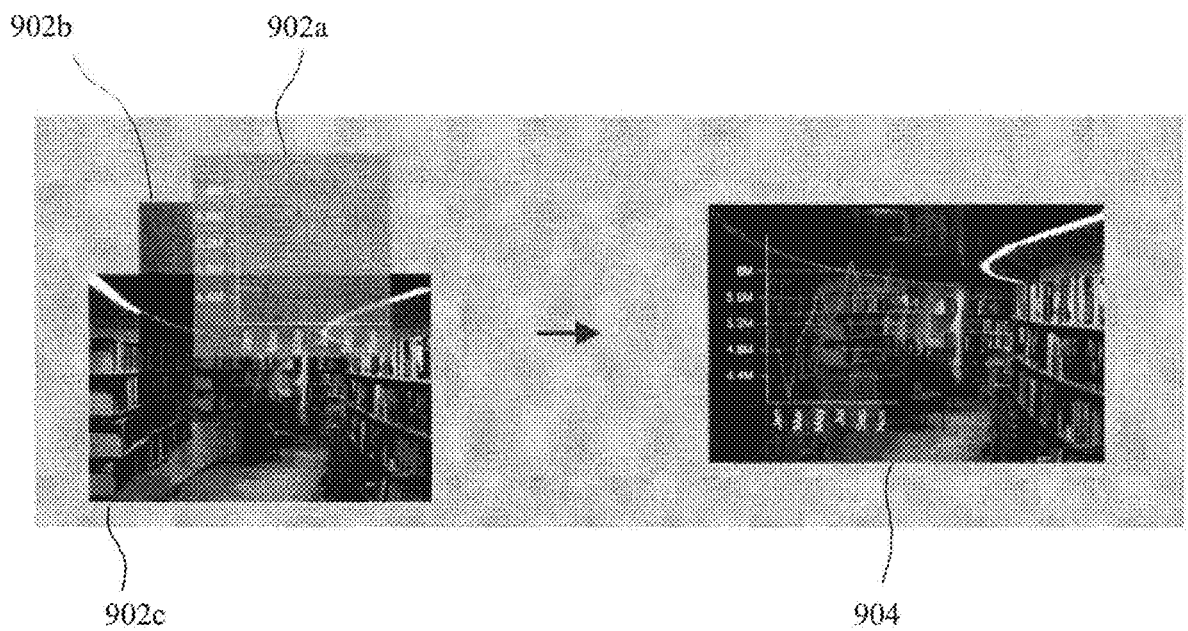
FIGS. 9A and 9B illustrate overlapping containers according to certain exemplary embodiments of the present invention.

To create a dossier having a free-form layout, a user can create a new dossier page or convert an existing dossier page to the free-form layout. FIG. 7 illustrates a screen shot of a dossier page in accordance with the present system. FIG. 7 illustrates a first situation in which a previous dossier page has not been created and a second situation in which a user wishes to convert an existing dossier page into a dossier page having a free-form canvass layout. To create a new dossier page with a free-form canvas layout, the user merely needs to select an icon 702 on the tool bar 704. The user will then start from a blank page and drag and drop individual containers into the dossier to create a new, desired layout. Similarly, to convert an existing dossier page into a dossier page with a free-form canvas layout, the user again merely needs to select the icon 702. Again, the user is able to drag and drop individual containers within the dossier to create a new, desired layout. Once the user creates, or converts an existing page into, a dossier page having a free-form canvas layout, the user can move a container up and down along the z-axis, and similarly move in the x-axis and the y-axis. Additionally, the user can take advantage of overlapping layers to create a specific dashboard design. For example, the system provides options including "bring to front," "bring forward," "send to back," "send backward," etc. These options can be accessed in a dropdown menu selected from the tool bar 704. FIG. 8 illustrates a "change visualization" drop down menu. If a user wishes to arrange multiple containers or frames in overlapping layers, the user can merely select options from the dropdown menu.

For example, FIG. 9A illustrates a plurality of individual layers 902a, 902b, 902c. In FIG. 9B, however, the three containers are overlapped one on top each other to form a single visualization 904 containing the information from each of the individual containers 902a, 902b, 902c.

Figure 10:
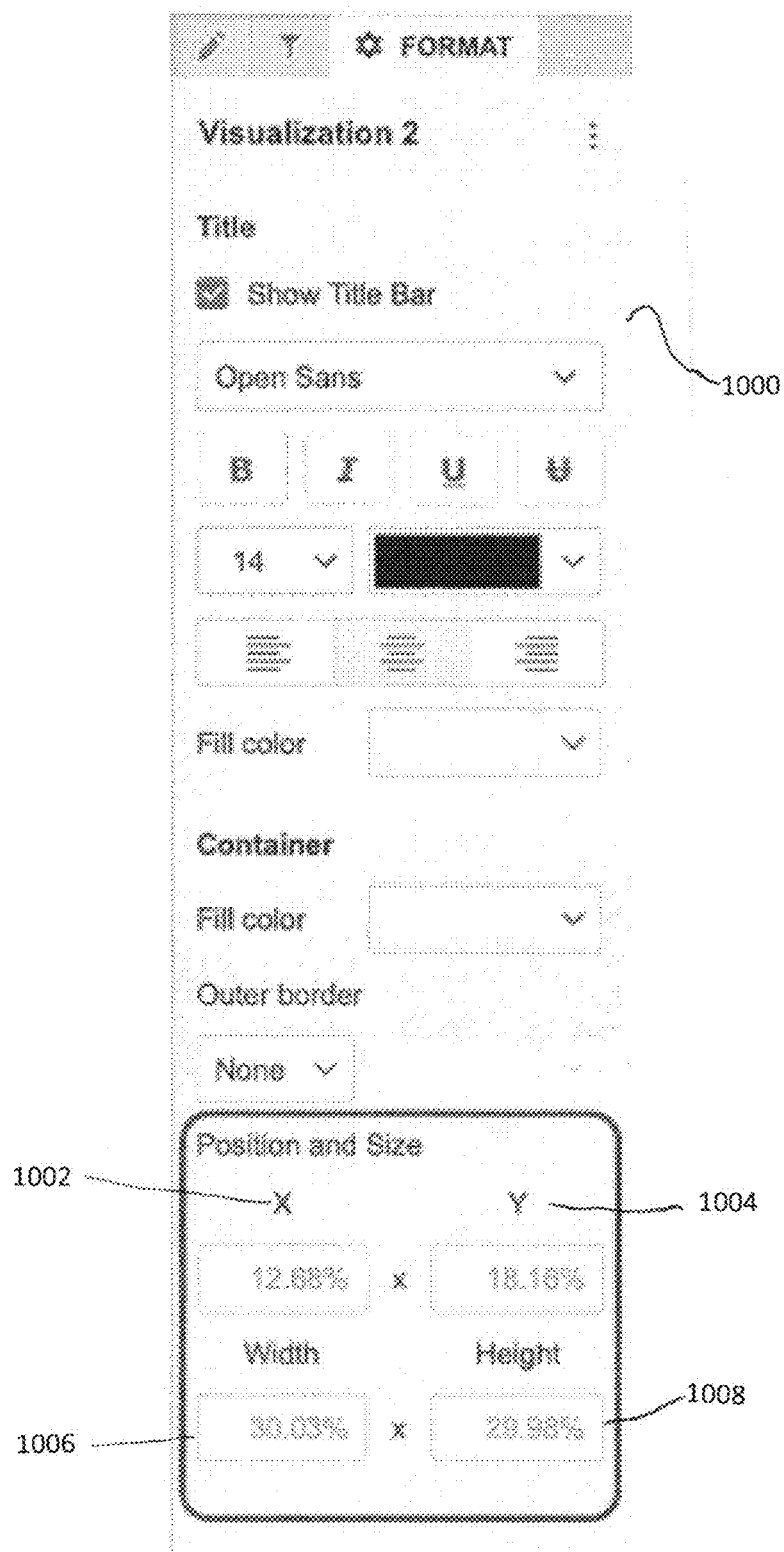
FIG. 10 illustrates a formatting drop-down menu according to certain exemplary embodiments of the present invention.

Moreover, the user is able to freely size and position the container or frames within the free-form canvas layout. Specifically, the user can select the container or frame. To select the container or frame, the user merely selects (e.g., clicks) on the container with the user's mouse to enable the container. Then the user can drag and drop the container anywhere the user wants. Once the user selects a container, the user can select a format function menu from the tool bar 704. FIG. 10 illustrates an example of the format function drop down menu 1000. The format function drop down menu 1000 allows a user to change the position of a selected container by changing the x percentage 1002 and y percentage 1004. Additionally, the format function drop down menu 1000 allows a user to change the position of a selected container by changing the width percentage 1006 and height percentage 1008. Thus, the size of a container can be individually changed while maintaining the relative position of the container within the canvas layout. Additionally, when the size of the container is scaled, individual elements within the container will also maintain their relative position.

Figure 13A:
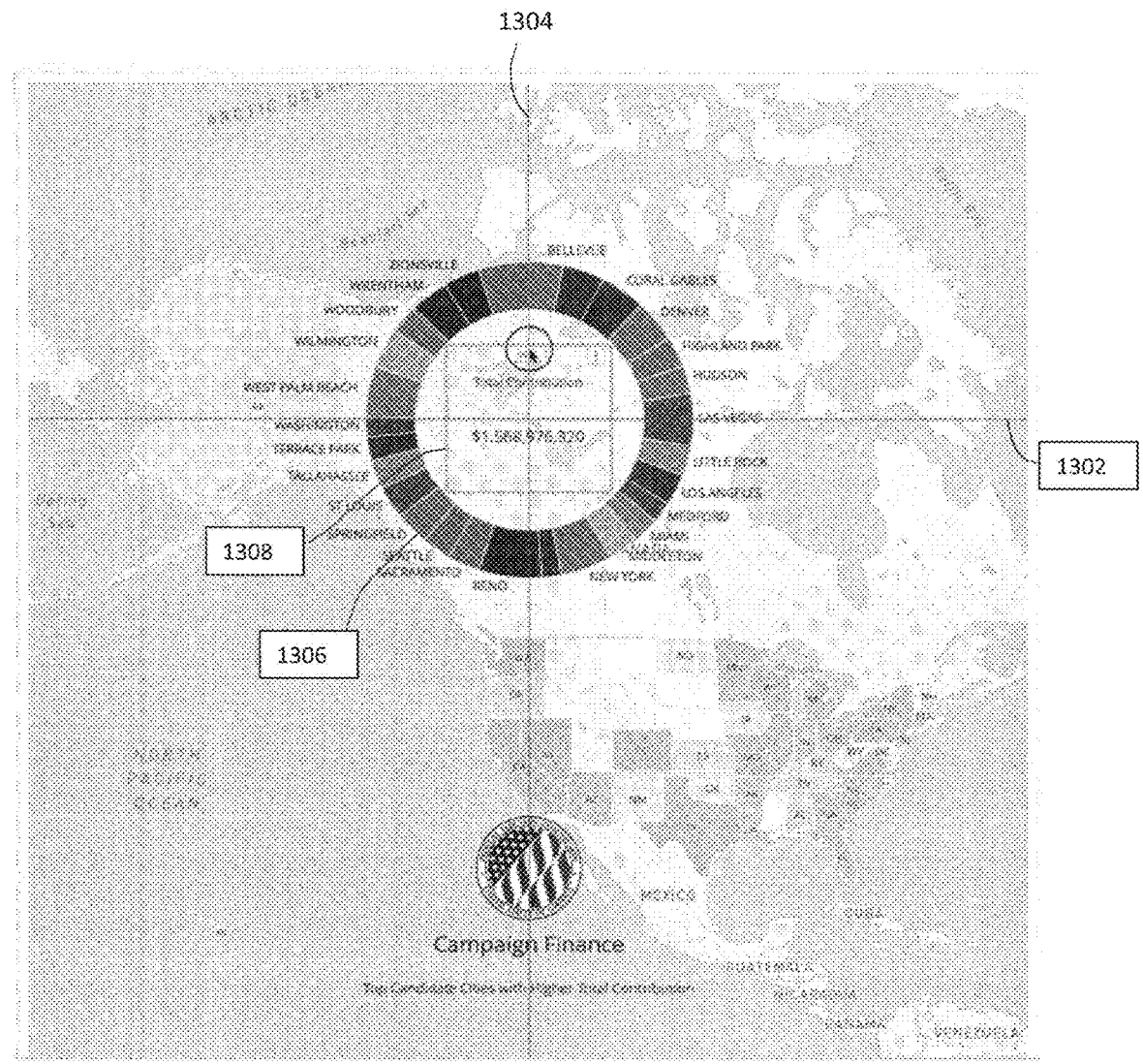
FIGS. 13A and 13B illustrates a dossier including alignment lines according to certain exemplary embodiments of the present invention.
Figure 13B:
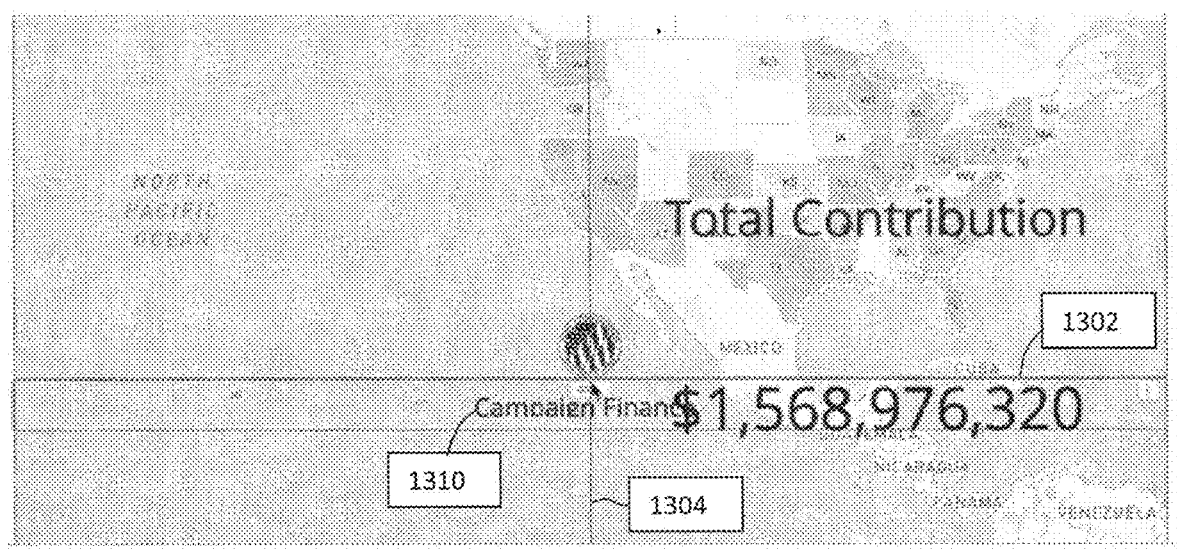

Moreover, the containers can be moved by simply dragging a container from a first position to a second position within the canvas layout. When dragging the containers, guides will be displayed to assist the user in aligning the containers. For example, as is illustrated in FIGS. 13A and 13B, the guides will include alignment lines. Specifically, FIGS. 13A and 13B illustrate a horizontal alignment line 1302 and a vertical alignment line 1304. The alignment lines guide the user to center containers horizontally and vertically with respect to the entire page/canvas or with respect to another container, without necessarily snapping/setting the containers close together, but merely for alignment purposes. For example, in FIG. 13A, the user is dragging a KPI visualization container 1308 (e.g., "Total Contribution") and the vertical alignment line 1304 and the horizontal alignment line 1302 automatically appear as the user drags KPI visualization container 1308 to indicate when the KPI visualization container 1308 is horizontally and vertically centered with respect to the ring chart 1306 surrounding the KPI visualization container 1308.

The alignment lines indicate vertical and horizontal alignment separately as the user drags the container, and the alignment lines can detect alignment with respect to the entire page/canvas or with respect to another container. For example, as is illustrated in FIG. 13B, when the user is positioning a text label 1310 (e.g., "Campaign Finance"), a vertical alignment line 1304 indicates when the text label 1310 is horizontally centered with respect to the entire canvas/page.

Figure 11:
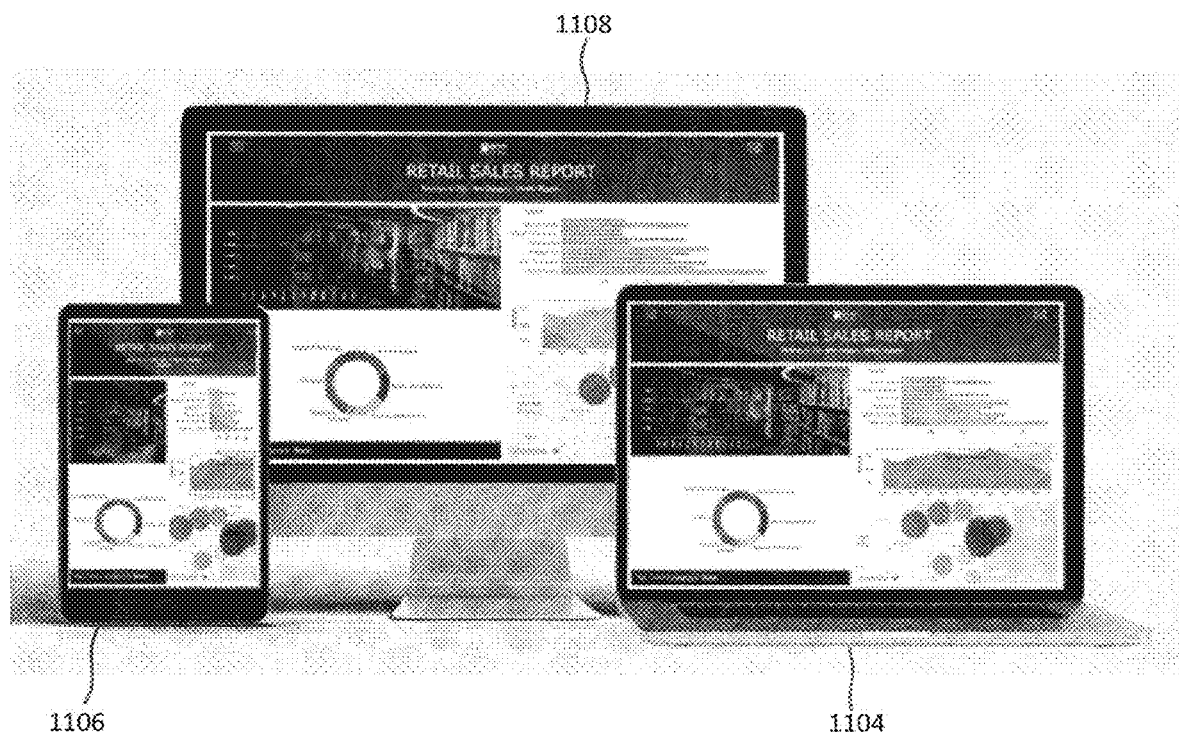
FIG. 11 illustrates a dossier created by certain exemplary embodiments as displayed on various platforms.
Figure 12:
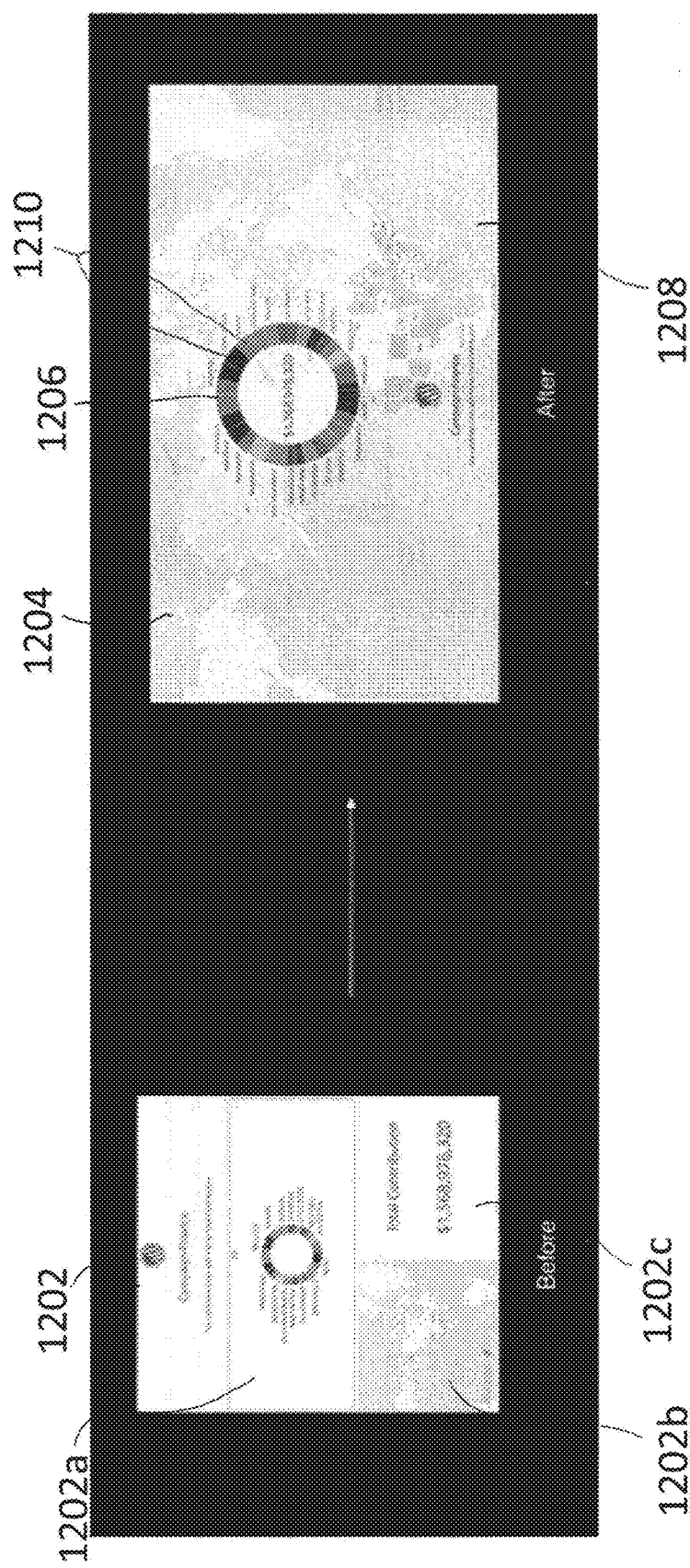
FIG. 12 illustrates a comparison of a dossier/dashboard created by current systems and a dossier/dashboard having a free-form layout in accordance with certain exemplary embodiments of the present invention.

Additionally, as illustrated in FIG. 11, once a user creates a dossier, the layout is automatically formatted by the system to be viewable on a display of any size. Accordingly, it is not necessary for a user to create different dossiers for different platforms or displays, or even to format the dossier for different displays or platforms. That is, FIG. 11 illustrates an example of a single dossier as viewed on a desktop computer screen 1102, a laptop computer screen 1104 and a tablet 1106. While the size of each container is changed to fit the dimensions of the specific display, the relative size and positon of each container in the canvas layout, as well as the relative size and position of information in each container, is maintained. The resizing the responsive and occurs automatically FIG. 12 illustrates a comparison of a dossier page 1202 created by a current reporting building system and a dossier page 1204 having a free-form canvass layout. The first dossier page 1202 contains three separate containers or frames 1202a, 1202b, 1202c. Each container contains a static visualization of user-specified data. The second dossier page 1204 includes the same containers that are illustrated in the first dossier page 1202. In the second dossier page 1204, the containers are overlapped in stacked layers to create a single, interactive representation of the data. For example, in the second dossier page 1204, a pie chart 1206 is presented on top of a map 1208. Each segment 1210 of the pie chart 1208 corresponds to an area of the map 1208. When a user selects one of the segments 1210 of the pie chart 1206, the dossier will zoom into a corresponding area on the map in a lower layer of the dossier page. Thus, the user can freely interact with the data from each of the containers.

Moreover, not only is it possible to overlap containers, but it is also possible to group the containers together in order to achieve more complex methods of presenting the data (e.g., by overlapping a ring chart with a KPI in the middle, or overlapping line charts and grids, then grouping them), in order to visualize different lenses of the data through "compound" visualizations that maintain their relative position and size when the dossier goes responsive. This automatic responsiveness and the ability to group containers that are overlapped, or positioned next to each other, allows authors to build content once and be able to deploy it in different form-factors, particularly in hand-held devices. That is, when the dossier goes responsive, containers auto-arrange in a vertical, scrollable stack, but grouped containers preserve their relative position, size and remain overlapped, so that compound visualizations created by the author are still consumable in screens with a reduced width (i.e. less than 768 (virtual) pixels, which is typical of hand-held devices).

Figure 14A:
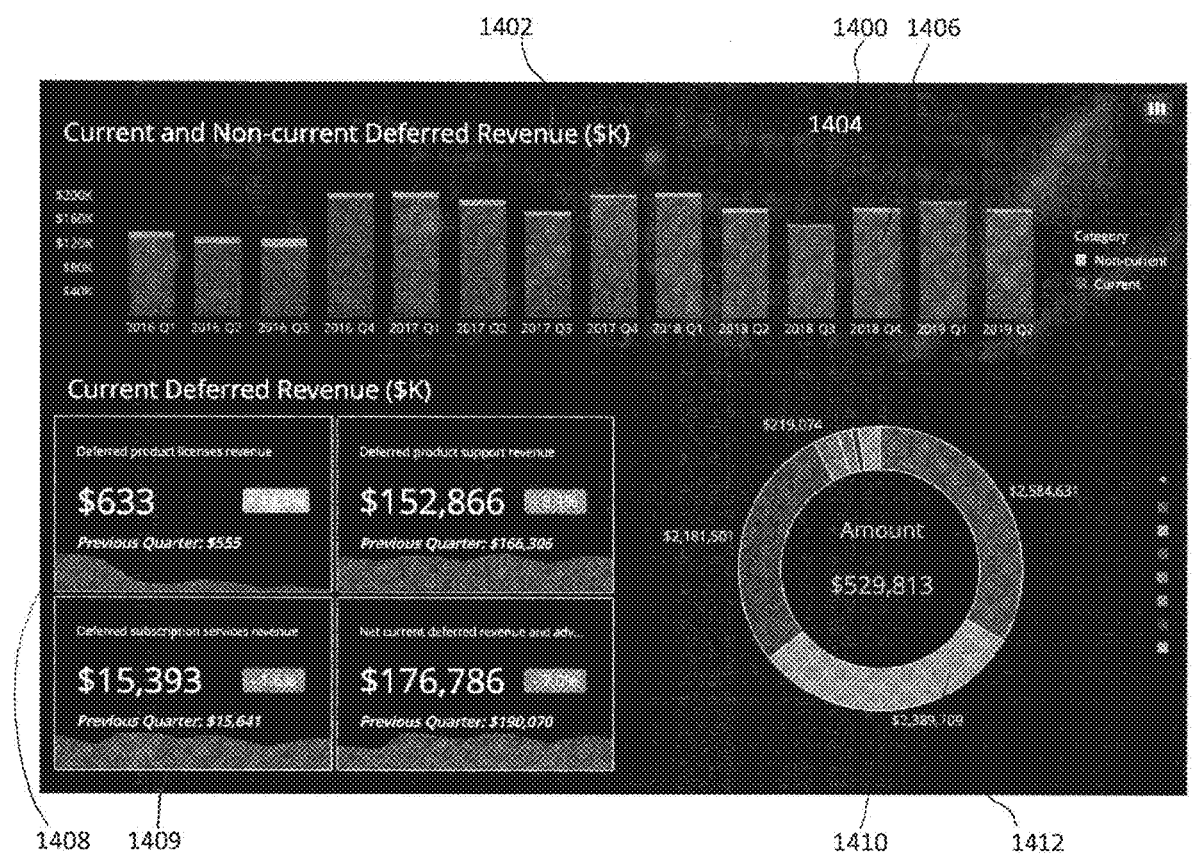
FIGS. 14A-14F illustrate another exemplary report generated by the system and method of the present invention.

FIGS. 14A-14F further illustrate the responsiveness feature of the present invention. FIG. 14A illustrates a dashboard having three main sections or groups. Applicants note that the dashboards of the present invention are not limited to a specific number of sections and the illustrations in FIGS. 14A-14F are merely exemplary.

The top section 1402 has an image container 1404 and a bar graph visualization container 1406. The bar graph visualization container 1406 has transparent fill color and overlaps the image container 1404, such that the image container 1404 acts as a background to the bar graph visualization container 1406. Additionally, the top section 1402 includes a smaller image container 1406 including a logo in the top right-hand corner of the top section 1402. The bottom left section 1408 includes a data container 1409 illustrating specific values from the bar graph visualization container 1406. The bottom right section 1410 includes a ring chart visualization container 1412.

Figure 14B:
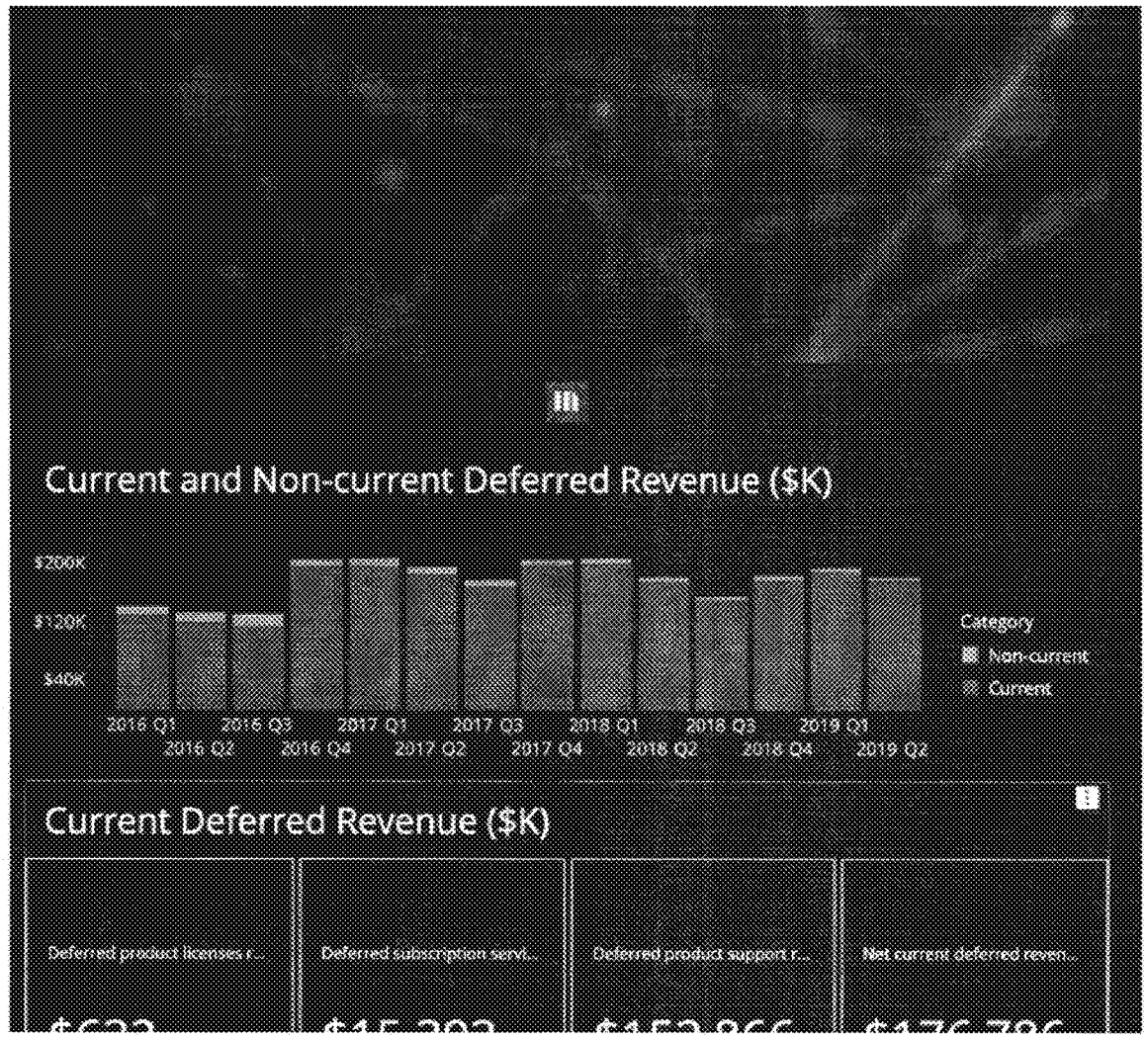
Figure 14C:
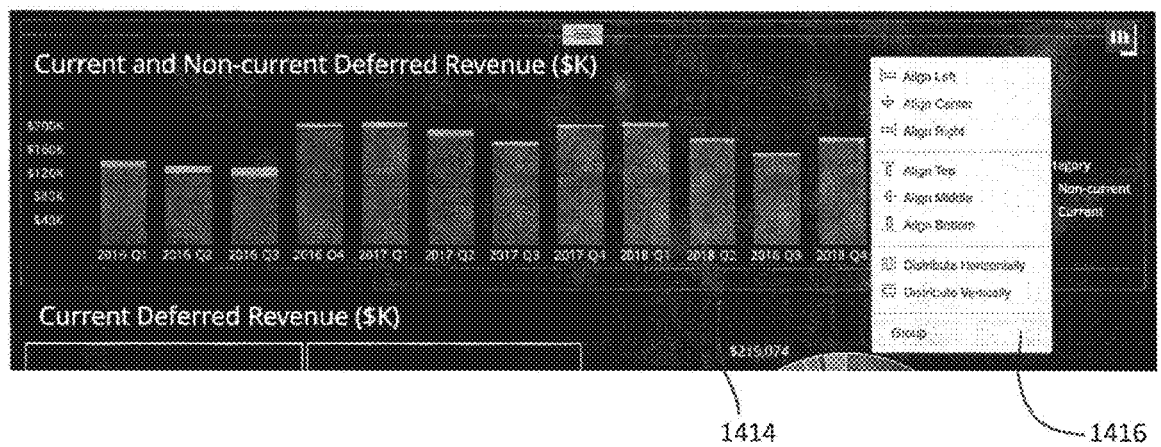
Figure 14D:
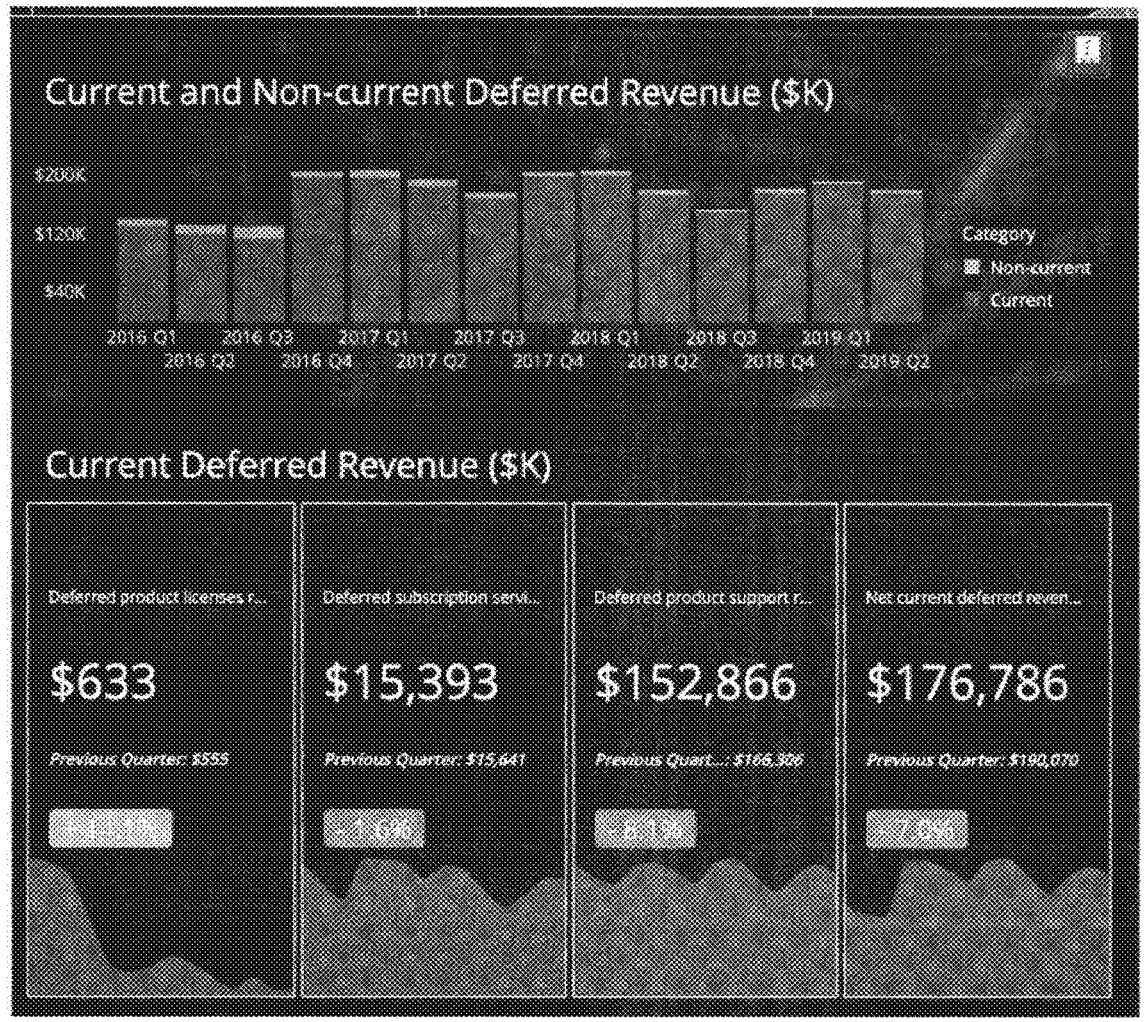

The dossier provides automatic responsiveness when the dossier is displayed in hand-held devices (or a tablet device), which, by default, stacks all of the containers vertically in the screen. FIG. 14B illustrates the vertically stacked containers. With the vertical stacking of containers, however, not all of the containers are visible on the screen of the hand-held device (or tablet), which is not desirable to the user (i.e., dossier designer). However, returning to the design mode, as illustrated in FIG. 14C below, the user can group containers to ensure they maintain their relative position and sizing when the dossier goes responsive and is displayed on a hand-held device (or tablet device). Specifically, FIG. 14C illustrates how the three containers are being selected (highlighted by bounding box) and grouped through a context menu 1416. Once the containers are highlighted and grouped together, the image container 1404 and the bar graph visualization container 1406 maintain their position as desired when the dossier becomes responsive and is displayed on a hand-held device (or tablet device), as is illustrated in FIG. 14D.

Figure 14E:
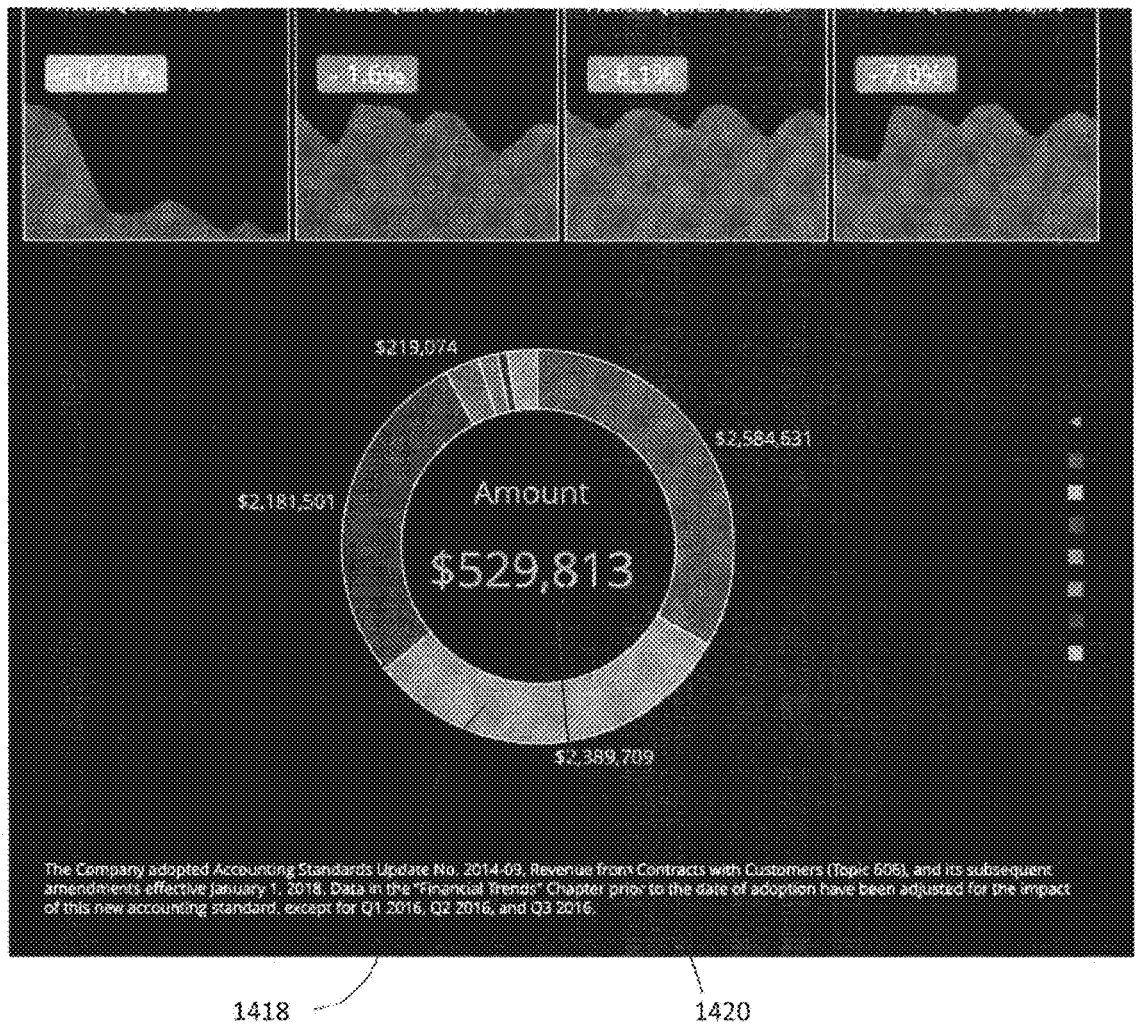

FIG. 14E illustrates an additional example of the dossier being responsive on a mobile device in which an overlying ring chart 1418 and a KPI 1420 in the center of the ring chart 1418.

Figure 14F:
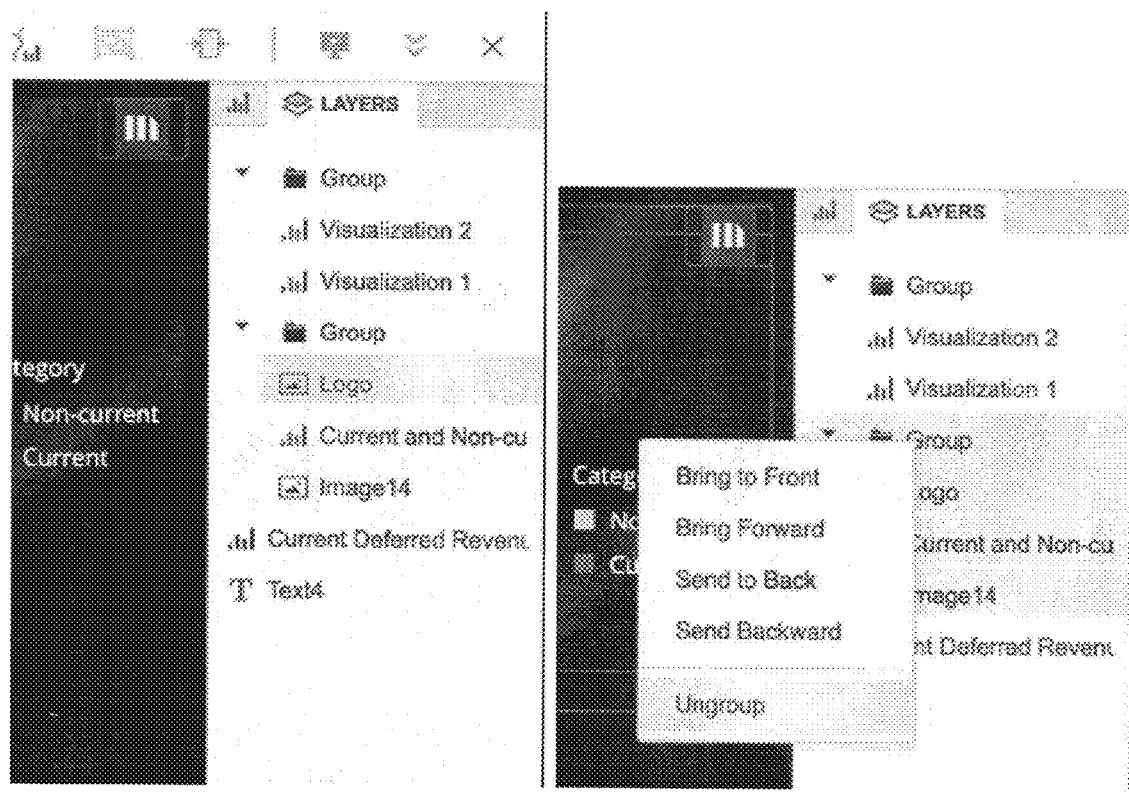

Additionally, the system of the present invention provides user (dossier designers) with a layers panel tool, which allows the user to easily control the z-axis position by dragging and dropping, as well as group or ungroup contains by mouse clicks and a context menu. The context menu is illustrated in FIG. 14F.

Accordingly, the present invention provides a report building system and method for business analytics that maintains responsiveness, can accommodate constantly updating data while increasing user flexibility in layout design.

While the invention has been described in terms of several exemplary embodiments, those skilled in the art will recognize that the invention can be practiced with modification within the spirit and scope of the appended claims.

Further, it is noted that, Applicant's intent is to encompass equivalents of all claim elements, even if amended later during prosecution.

What is claimed is:

1. A computer-implemented method, comprising:
retrieving data from a database, the data having a data structure;
generating, by a processor with input from a user, a report including a graphical representation of the data, the graphical representation of the data including a plurality of data containers, the user being enabled to freely position and set a size of each of the plurality of data containers; and
displaying the report on a graphical user interface,
wherein the plurality of data containers is configured to be layered on top of each other to form a single interactive visualization containing information from each of the plurality of data containers such that the user can interact with data from each of said plurality of data containers and simultaneously view the information from each of the plurality of data containers in the single interactive visualization,
wherein a first data container of the plurality of data containers includes a first visualization having a plurality of first user-selectable portions and a second data container of the plurality of data containers includes a second visualization having a plurality of second user-selectable portions,
wherein each of the plurality of first user-selectable portions corresponds to one of the plurality of second user-selectable portions in a one-to-one relationship,
wherein the user is enabled to move the plurality of data containers by dragging the plurality of data containers,
wherein, upon the user dragging one or more of the plurality of data containers, guides are automatically displayed to assist the user when moving the one or more of the plurality of data containers, the guides separately comprising a vertical alignment line and a horizontal alignment line, the vertical alignment line and the horizontal alignment line configured to detect alignment with respect to an entirety of the report and/or another data container to guide the user to center the first data container with respect to the second data container,
wherein the plurality of data containers is configured to be overlapped, and
wherein, when the report is created, containers, of the plurality of data containers, that overlap preserve their relative position and size and remain overlapped while containers, of the plurality of data containers, that do not overlap are automatically, without user intervention, arranged in a vertical, scrollable stack.

2. A non-transitory computer processor-readable storage medium storing instructions configured for execution by a computer to perform the method recited in claim 1.

3. The method according to claim 1, wherein the user is enabled to freely position and set the size of each of the plurality of data containers, independently from the position and size of other containers of the plurality of data containers.

4. The method according to claim 1, wherein the user is enabled to group one or more of the plurality of data containers.

5. The method according to claim 1, wherein the user is enabled to change the size of one of the plurality of data containers without effecting the size of other data containers.

6. The method according to claim 1, wherein the user is enabled to move the plurality of data containers along a z-axis, a y-axis and an x-axis.

7. The method according to claim 1, wherein each of the plurality of data containers includes an individual visualization, and
wherein when the data containers are layered on top of each other, the individual visualizations from the plurality of data containers are superimposed to form the single interactive visualization.

8. The method according to claim 1, wherein the guides guide the user without setting the containers in place.

9. The method according to claim 1, wherein the guides automatically appear as the user drags the one or more containers of the plurality of data containers.

10. A computer-implemented system, comprising:
a database storing data, the data having a data structure;
a processor configured to generate, with user input, a report including a graphical representation of the data, the graphical representation of the dataset including a plurality of data containers, such that the processor is configured to enable the user to freely position and set a size of the plurality of data containers; and
a graphical user interface configured to display the report,
wherein the plurality of data containers is configured to be layered on top of each other to form a single interactive visualization containing information from each of the plurality of data containers such that the user can interact with data from each of said plurality of data containers and simultaneously view the information from each of the plurality of data containers in the single interactive visualization,
wherein a first data container of the plurality of data containers includes a first visualization having a plurality of first user-selectable portions and a second data container of the plurality of data containers includes a second visualization having a plurality of second user-selectable portions,
wherein each of the plurality of first user-selectable portions corresponds to one of the plurality of second user-selectable portions in a one-to-one relationship,
wherein the user is enabled to move the plurality of data containers by dragging the plurality of data containers,
wherein, upon the user dragging one or more of the plurality of data containers, guides are automatically displayed to assist the user when moving the one or more of the plurality of data containers, the guides separately comprising a vertical alignment line and a horizontal alignment line, the vertical alignment line and the horizontal alignment line configured to detect alignment with respect to an entirety of the report and/or another data container to guide the user to center the first data container with respect to the second data container, wherein the plurality of data containers is configured to be overlapped, and wherein, when the report is created, containers, of the plurality of data containers, that overlap preserve their relative position and size and remain overlapped while containers, of the plurality of data containers, that do not overlap are automatically, without user intervention, arranged in a vertical, scrollable stack.

11. A computer-implemented method, comprising:

retrieving data from a database, the data having a data structure;

generating, by a processor with input from a user, a report including a graphical representation of the data, the graphical representation of the data including a plurality of data containers, the user being enabled to freely position and set a size of each of the plurality of data containers, the report being generated on a first device of a first size and being configured to be viewed on a second device of a size smaller than the first size;

during said generating the report, overlapping some of the plurality of data containers on top of each other to form a single interactive visualization containing information from each of the plurality of data containers such that the user can interact with data from each of said plurality of data containers and simultaneously view the information from each of the plurality of data containers in the single interactive visualization;

displaying the report on a graphical user interface of the first device; and after said generating the report, automatically formatting the report to be displayed on the second device, wherein, when the report is displayed on the second device, containers, of the plurality of data containers, that overlap preserve their relative position and size and remain overlapped while containers, of the plurality of data containers, that do not overlap are automatically, without user intervention, arranged in a vertical, scrollable stack.

12. The method according to claim 11, wherein a first data container of the plurality of data containers includes a first visualization having a plurality of first user-selectable portions and a second data container of the plurality of data containers includes a second visualization having a plurality of second user-selectable portions.

13. The method according to claim 12, wherein each of the plurality of first user-selectable portions corresponds to one of the plurality of second user-selectable portions in a one-to-one relationship.

14. The method according to claim 11, wherein the user is enabled to move the plurality of data containers by dragging the plurality of data containers, and wherein, upon the user dragging one or more of the plurality of data containers, guides are automatically displayed to assist the user when moving the one or more of the plurality of data containers, the guides separately comprising a vertical alignment line and a horizontal alignment line, the vertical alignment line and the horizontal alignment line configured to detect alignment with respect to an entirety of the report and/or another data container to guide the user to center the first data container with respect to the second data container.

* * * * *